(12) United States Patent
Chen et al.

(10) Patent No.: US 11,140,533 B2
(45) Date of Patent: Oct. 5, 2021

(54) ENABLE RELIABLE AND DISTRIBUTED M2M/IOT SERVICES

(71) Applicant: CONVIDA WIRELESS, LLC, Wilmington, DE (US)

(72) Inventors: Zhuo Chen, Claymont, DE (US); Dale N. Seed, Allentown, PA (US); Quang Ly, North Wales, PA (US); Catalina Mihaela Mladin, Hatboro, PA (US); William Robert Flynn, IV, Schwenksville, PA (US); Rocco Di Girolamo, Laval (CA); Shoshana Loeb, Philadelphia, PA (US); Chonggang Wang, Princeton, NJ (US); Michael F. Starsinic, Newtown, PA (US)

(73) Assignee: Convida Wireless, LLC, Wilmington, DE (US)

( * ) Notice: Subject to any disclaimer, the term of this patent is extended or adjusted under 35 U.S.C. 154(b) by 4 days.

(21) Appl. No.: 16/611,924

(22) PCT Filed: May 11, 2018

(86) PCT No.: PCT/US2018/032238
§ 371 (c)(1),
(2) Date: Nov. 8, 2019

(87) PCT Pub. No.: WO2018/209189
PCT Pub. Date: Nov. 15, 2018

(65) Prior Publication Data
US 2021/0084470 A1   Mar. 18, 2021

Related U.S. Application Data

(60) Provisional application No. 62/505,439, filed on May 12, 2017.

(51) Int. Cl.
*H04W 4/00* (2018.01)
*H04L 29/06* (2006.01)
(Continued)

(52) U.S. Cl.
CPC ........... *H04W 4/70* (2018.02); *G06F 11/1451* (2013.01); *H04L 67/12* (2013.01); *H04L 69/40* (2013.01)

(58) Field of Classification Search
CPC ...... H04W 4/70; G06F 11/1451; H04L 67/12; H04L 69/40
See application file for complete search history.

(56) References Cited

U.S. PATENT DOCUMENTS

2010/0070563 A1* 3/2010 Baker ..................... H04L 69/40
709/203
2014/0242953 A1* 8/2014 Astrom ................... H04W 4/12
455/412.1
(Continued)

FOREIGN PATENT DOCUMENTS

WO   2016/089262 A1   6/2016

OTHER PUBLICATIONS

"OIC Core Specification V1.1.1 Part 1", Open Connectivity Foundation (OCF), Copyright 2016, 151 pages.
(Continued)

*Primary Examiner* — Christopher B Robinson
(74) *Attorney, Agent, or Firm* — BakerHostetler

(57) ABSTRACT

A registration procedure may allow one active and multiple inactive SL registrations to be created at different service layer entities for an application entity without adding significant overhead and burden to an application entity.

17 Claims, 33 Drawing Sheets

(51) Int. Cl.
*H04W 4/70* (2018.01)
*G06F 11/14* (2006.01)
*H04L 29/08* (2006.01)
*H04L 29/14* (2006.01)

(56) References Cited

U.S. PATENT DOCUMENTS

| | | | |
|---|---|---|---|
| 2015/0358874 A1* | 12/2015 | Ahn | H04W 48/16 |
| | | | 370/331 |
| 2015/0373481 A1 | 12/2015 | Eom et al. | |
| 2016/0219116 A1* | 7/2016 | Smith | H04L 63/145 |
| 2017/0041231 A1* | 2/2017 | Seed | H04L 67/12 |
| 2018/0198680 A1* | 7/2018 | Mladin | H04W 4/70 |

OTHER PUBLICATIONS

ETSI 102690 V1.1.1, Technical Specification, "Machine to Machine Communications (M2M); Functional Architecture".
OneM2M Technical Specification TS-0001 V2.3.0, "Functional Architecture", Aug. 7, 2015, 352 pages.

* cited by examiner

ENABLE RELIABLE AND DISTRIBUTED M2M/IOT SERVICES

CROSS-REFERENCE TO RELATED APPLICATIONS

This application is the National Stage of International Patent Application No. PCT/US2018/032238, filed May 11, 2018, which claims the benefit of U.S. Provisional Application No. 62/505,439, filed May 12, 2017, the disclosure of which is hereby incorporated by reference as if set forth in its entirety herein.

BACKGROUND

A machine-to-machine/internet of things service layer (M2M/IoT SL) is a technology specifically targeted towards providing value-added services for M2M/IoT devices and applications. Several industry standard bodies (e.g., oneM2M, European Telecommunications Standards Institute, and Open Connectivity Foundation) have been developing M2M/IoT SLs to address the challenges associated with the integration of M2M/IoT devices and applications into deployments with the Internet/Web, cellular, enterprise, and home network.

An M2M/IoT SL can provide applications and devices access to a collection of M2M/IoT oriented capabilities. A few examples include security, charging, data management, device management, discovery, provisioning, and connectivity management. These capabilities are made available to applications via APIs which make use of message formats, resource structures and resource representations supported by the M2M/IoT SL.

From a protocol stack perspective, SLs are typically situated above the Application Protocol Layer and provide value added services to applications they support. Hence SLs are often categorized as 'middleware' services. FIG. 1 illustrates an exemplary service layer 100 between Application Protocols and Applications.

oneM2M Functional Architecture

The oneM2M standard (e.g., oneM2M Functional Architecture-V2.9.0) under development defines a Service Layer called "Common Service Entity (CSE)". The purpose of the Service Layer is to provide "horizontal" services that can be utilized by different "vertical" M2M systems and applications. The CSE supports four reference points as shown in FIG. 2. The Mca reference point interfaces with the Application Entity (AE). The Mcc reference point interfaces with another CSE within the same service provider domain and the Mcc' reference point interfaces with another CSE in a different service provider domain. The Mcn reference point interfaces with the underlying network service entity (NSE). An NSE provides underlying network services to the CSEs, such as device management, location services and device triggering.

CSE contains multiple logical functions called "Common Service Functions (CSFs)", such as "Discovery" and "Data Management & Repository". FIG. 3 illustrates some of the CSFs defined by oneM2M. The oneM2M architecture enables the following types of Nodes:

Application Service Node (ASN): An ASN is a Node that contains one CSE and contains at least one Application Entity (AE). Example of physical mapping: an ASN could reside in an M2M Device.

Application Dedicated Node (ADN): An ADN is a Node that contains at least one AE and does not contain a CSE. There may be zero or more ADNs in the Field Domain of the oneM2M System. Example of physical mapping: an Application Dedicated Node could reside in a constrained M2M Device.

Middle Node (MN): A MN is a Node that contains one CSE and contains zero or more AEs. There may be zero or more MNs in the Field Domain of the oneM2M System. Example of physical mapping: a MN could reside in an M2M Gateway.

Infrastructure Node (IN): An IN is a Node that contains one CSE and contains zero or more AEs. There is exactly one IN in the Infrastructure Domain per oneM2M Service Provider. A CSE in an IN may contain CSE functions not applicable to other node types. Example of physical mapping: an IN could reside in an M2M Service Infrastructure.

Non-oneM2M Node (NoDN): A non-oneM2M Node is a Node that does not contain oneM2M Entities (neither AEs nor CSEs). Such Nodes represent devices attached to the oneM2M system for interworking purposes, including management.

The possible configurations of inter-connecting the various entities supported within the oneM2M system are illustrated in FIG. 4.

Identifying Resources and Entities. Within the Resource Oriented Architecture (ROA) of oneM2M, there is a distinction between resources hosted in the oneM2M service layer, and entities which interact with the oneM2M system. At the service layer interactions are initiated by entities (AEs or CSEs) through a request operation, and these requests target a resource. The response to each of these requests is just between two entities. As a consequence, within the M2M/IoT service provider domain, each resource needs to be identified by a unique resource ID, and each entity (AE and CSE) needs to be identified by a unique entity ID. Additional details are provided below with regard to the CSE Identifier (CSE-ID), AE identifier (AE-ID), and resource ID.

CSE-ID identifies a CSE, and is used for interactions from or to a CSE. Service providers assign a relative CSE-ID to each CSE, which is unique within the service provider domain. The relative CSE-ID can be made globally unique by prefixing a unique M2M/IoT Service Provider ID.

AE-ID is used to uniquely identify an AE resident on an M2M/IoT Node, or an AE that requests to interact with an M2M/IoT Node. In order to use the M2M/IoT services offered by the oneM2M service layer, applications must first register to a CSE. During this registration request, the application entity can either request a service provider assigned AE-ID (assigned by the IN-CSE) or a 'locally' assigned AE-ID (assigned by the CSE the application is registering with, also known as the registrar CSE). If assigned by the IN-CSE, the AE-ID is unique within the service provider domain. In such a case, the AE-ID starts with an 'S' character. In contrast, if the AE-ID is assigned by the registrar CSE, it is only unique among applications registered to this CSE. In such a case, the AE-ID starts with a 'C' character. Locally assigned AE-ID can be made unique within the service provider domain, by prefixing the CSE-ID of the registrar CSE.

Most resource IDs are assigned by the CSE that is hosting the resource. The CSE may assign an unstructured ID or a structured ID. An unstructured ID is a sequence of characters that uniquely identifies the resource within the hosting CSE. In contrast, a structured ID identifies the resource within the CSE through its parent-child-relationships. It is very similar to how filenames are identified by their path, in an operating system directory structure. The resource ID can be made unique within the service provider domain, by prefixing the CSE-ID of the hosting CSE. In such a case, the ID is referred to as "Service Provider Relative Resource ID." In particular, this ID uniquely identifies the resource within the M2M/IoT service provider domain as well as the CSE where the resource is hosted. In addition, any Resource ID can be made globally unique by prefixing a unique M2M/IoT Service Provider ID. In such a case, the ID is referred to as "Absolute Resource ID." One important caveat about the M2M/IoT resource IDs is that they carry no routing information.

So for example, FIG. 5 shows an absolute resource identifier. As shown, this resource is located within the service provider domain with M2M/IoT Service Provide ID='www.m2mprovider2.com'. The block uniquely identifies a resource in the service provider domain identified with service provider ID: www.m2mprovider2.com, and which is located in CSE001. The resource is located under resource 'AE1/', and has resource name 'contr001'. Significantly, the resource is not located on the server with FQDN www.m2mprovider2.com. Rather it is located on the server hosting CSE with CSE-ID CSE001. In oneM2M, the routing information of this server is maintained in a Point of Access (PoA) attribute which provides the routable location of this CSE. Note however that the PoA may include another FQDN which denotes server hosting the CSE with CSE-ID CSE001.

oneM2M Service Layer Registration. An AE on an ASN, an MN or an IN performs registration locally with the corresponding CSE in order to use M2M/IoT services offered by that CSE. An AE on an ADN performs registration with the CSE on an MN or an IN in order to use M2M/IoT services offered by that CSE. An IN-AE performs registration with the corresponding CSE on an IN in order to use M2M/IoT services offered by that IN CSE.

The CSE on an ASN performs registration with the CSE in the MN in order to be able to use M2M/IoT Services offered by the CSE in the MN. As a result of successful ASN-CSE registration with the MN-CSE, the CSEs on the ASN and the MN establish a relationship allowing them to exchange information.

The CSE on an MN performs registration with the CSE of another MN in order to be able to use M2M/IoT Services offered by the CSE in the other MN. As a result of successful MN-CSE registration with the other MN-CSE, the CSEs on the MNs establish a relationship allowing them to exchange information.

The CSE on an ASN or on an MN perform registration with the CSE in the IN in order to be able to use M2M/IoT Services offered by the CSE in the IN. As a result of successful ASN/MN registration with the IN-CSE, the CSEs on ASN/MN and IN establish a relationship allowing them to exchange information.

In the above described cases, the AE or CSE performing the registration is referred to as a registree AE or registree CSE. The CSE on which the AE/CSE is registering is referred to as the registrar CSE.

Following a successful registration of an AE to a CSE, the AE is able to access, assuming access privilege is granted, the resources in all the CSEs that are potential targets of request from the registrar CSE. The followings are some conventional registration regulations: 1) an AE shall not be registered to more than one CSE (ASN-CSE, MN-CSE or IN-CSE); 2) An ASN-CSE shall be able to be registered to at most one other CSE (MN-CSE or IN-CSE); 3) An MN-CSE shall be able to be registered to at most one other CSE (MN-CSE or IN-CSE); 4) A concatenation (registration chain) of multiple uni-directional registrations shall not form a loop. E.g. two MN-CSEs A and B, cannot register with each other. Three MN-CSEs A, B and C, where A registers to B, and B registers to C, then C cannot register to A.

FIG. 6 illustrates an exemplary oneM2M CSE Registration procedure. The Registration procedure requires the creation of two resources (a <remoteCSE> on the Receiver CSE and a <remoteCSE> on the Originator CSE). Originator: The Originator is the registree CSE. Receiver: The Receiver is the registrar CSE creating the <remoteCSE> resource initially.

Step 001: The Originator shall send the CREATE Request message. Step 002: The Receiver shall process the registration request message. Step 003: The Receiver shall respond with a registration Response message that contains the address/URI of the registered CSE. Step 004: The Originator, upon receipt of the CREATE response message, shall create a <remoteCSE> resource locally under its <CSE-Base> resource. This resource is representing the Receiver CSE. The Originator shall provide the appropriate values to all mandatory parameters. Step 005: The Originator may issue a RETRIEVE Request towards the Receiver (same To as for the CREATE request message) to obtain the optional parameters of the <remoteCSE> resource created at the Receiver as for step 004 (e.g. labels, accessControlPolicyIDs attributes). Step 006: The Receiver verifies that the Originator has the appropriate privileges to access the information. Step 007: The Receiver sends a RETRIEVE response message. Step 008: The Originator shall update the created <remoteCSE> resource for the Receiver with the information obtained in step 007.

The procedure for AE registration follows the message flow description depicted in FIG. 7A-FIG. 7C. Originator: The Originator shall be the registree AE. Receiver: The Receiver shall allow the creation of the <AE> resource according to the access control policy and information in the applicable subscription profile. The Receiver shall derive the applicable M2M/IoT-Service-Profile-ID from the CSE-ID of the registrar CSE. Step 001: Optional: In case the registree AE intends to use a Security Association to perform the registration, a Security Association Establishment procedure shall get carried out first. Step 002: The Originator shall send the information for the registration CREATE procedure with the following specific information in the CREATE Request message: From: AE-ID-Stem or NULL. In case the registree AE has already registered successfully before, then deregistered and intends to register again with the same AE-ID-Stem value as before, the registree AE shall include that AE-ID-Stem value into the From parameter. In case the registree AE has not registered successfully before and intends to get an M2M/IoT-SP-assigned AE-ID-Stem starting with an 'S' character assigned to itself but it does not have any specific value to suggest, it shall set the From parameter to the character 'S'. In case the registree AE intends to initiate a fresh registration and has no preference for the AE ID Stem value, the From parameter shall be set to NULL.

Step 003: The Receiver shall determine whether the request to register the registree AE meets any of the following conditions: Check if the applicable service subscription profile lists a combination of (allowed AE-ID-Stem value and allowed App-ID value) for the Credential-ID and the registrar CSE-ID that match with the App-ID attribute in the Content parameter of the request and the AE-ID-Stem in the From parameter of the request. The applicable rules for this checking are contained in the <serviceSubscribedAppRule> resource(s) which are linked to by the ruleLinks attribute of the <m2mServiceSubscribedNode> resource(s) associated with the registrar CSE. Step 004: If the From parameter of the request provides an AE-ID-Stem value, the registrar CSE shall check whether an <AE> resource with an Unstructured-CSE-relative-Resource-ID identical to the AE-ID-Stem value provided in the From parameter of the request does already exist. If so, there is still an active registration using the same AE-ID-Stem on the registrar CSE and the registrar CSE shall respond with an error.

The procedure continues with one for the following cases a)-d), details can be found in oneM2M-TS-0001 oneM2M Functional Architecture-V-2.6.0. Case a) AE-ID-Stem starts with 'S' and AE does not include an AE-ID-Stem (initial registration). Case b) AE-ID-Stem starts with 'S' and AE includes an AE-ID-Stem (re-registration). Case c) AE-ID-Stem starts with 'C' and AE does not include an AE-ID-Stem (initial registration). Case d) AE-ID-Stem starts with 'C' and AE includes an AE-ID-Stem (re-registration).

oneM2M Service Layer Announced Resource. The oneM2M standard defined an announced resource scheme to facilitate the resource discovery. As shown in FIG. 8, AE1 register to MN-CSE1, MN-CSE1 register to MN-CSE2, and MN-CSE2 register to IN-CSE. After AE1 creates a resource at the MN-CSE1, AE1 may request the M2M/IoT Gateway hosting MN-CSE1 to announce the information to the MN-CSE2 and IN-CSE. Thus, other entities can discover the announced resource at MN-CSE2 and IN-CSE. In particular, AE1 sends a request to create an entry associated with MN-CSE1 in the announceTo attribute at the original resource on MN-CSE 1. The MN-CSE 1 then sends a request to MN-CSE 2 to create an announced resource as shown in FIG. 9. The announced resource contains a "link" attribute, which stores the URI of the original resource. The MN-CSE 1 can send a request to create an announced resource at IN-CSE as shown in FIG. 10.

SUMMARY

Some M2M/IoT systems require reliable and continued service. In this disclosure, method, systems, and apparatuses are disclosed to enable distributed service by SL entities at the edge of the network without introducing significant overhead to M2M/IoT constrained devices.

In an example, a registration procedure may allow one active and multiple inactive SL registrations to be created at different SL Entities for an application entity without adding significant overhead and burden to an application entity.

In an example, a procedure may enable the active SL registrar Entity to efficiently keep SL context synchronized on the inactive SL registrar entities for the registree Entity without adding significant overhead and burden to the registree entity.

In an example, procedures may trigger an inactive SL registrar Entity to provide reliable and continued service when the active SL registrar entity is non-functional.

In an example, a procedure may enable a SL Entity to provide reliable and continued service to other SL Entities when it is recovered from a failure. A combination of multiple (e.g., any combination) of the aforementioned examples, which are further disclosed herein, may be considered a registration management method.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EXAMPLES

In conventional systems, there may be service interruption and lack of service continuity when an apparatus is disabled. Disclosed herein are methods, systems, and apparatuses that address issues regarding enabling reliable and continued distributed M2M/IoT services.

Figure 1:
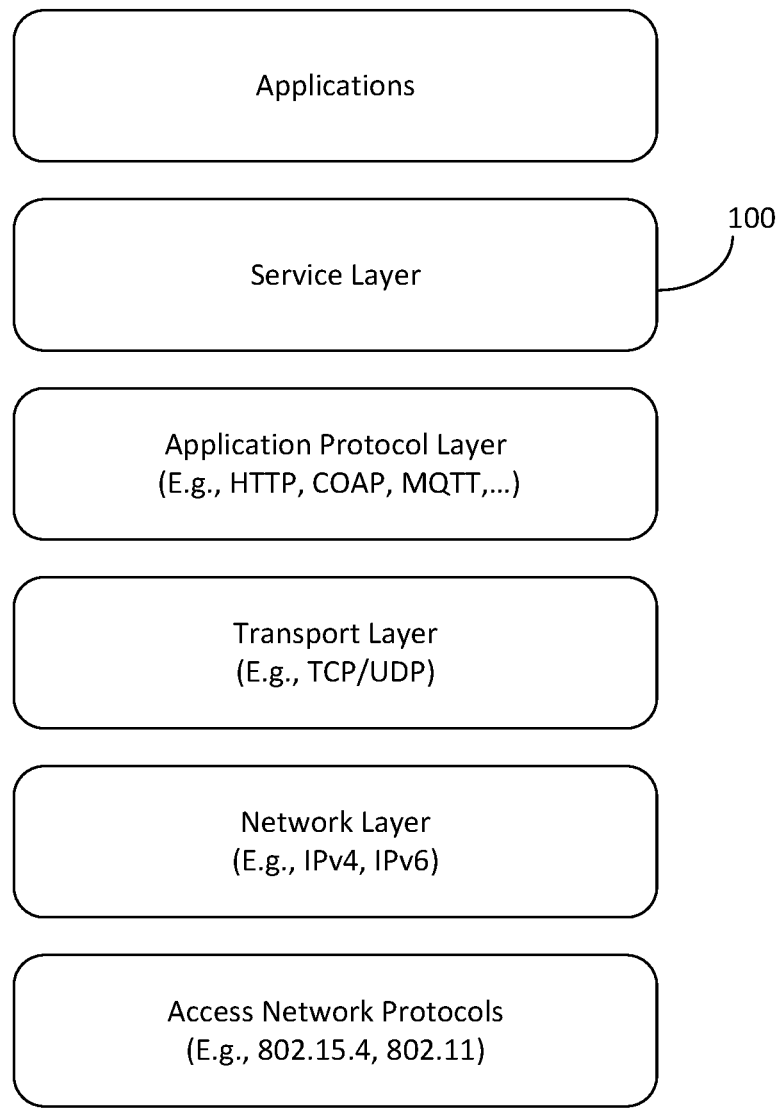
FIG. 1 illustrates an exemplary service layer between the Application Protocols and Applications.
Figure 2:
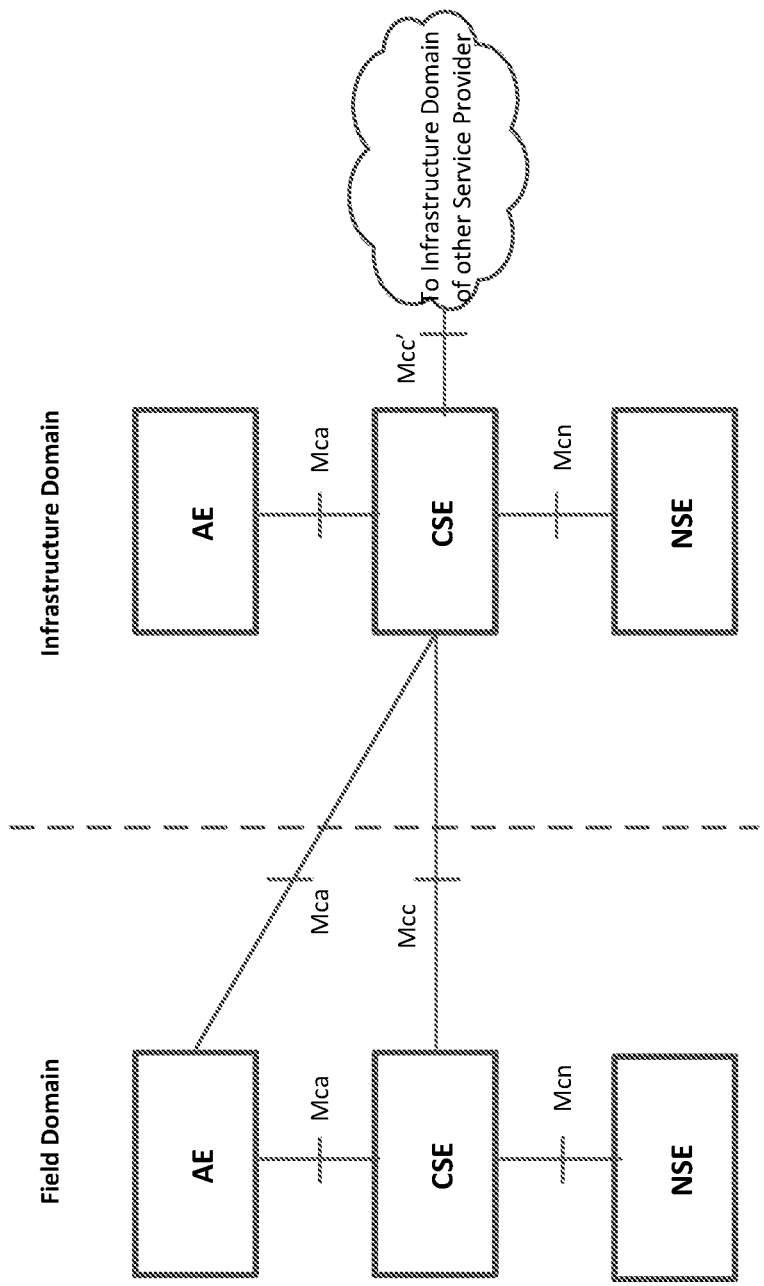
FIG. 2 illustrates exemplary oneM2M Architecture.
Figure 3:
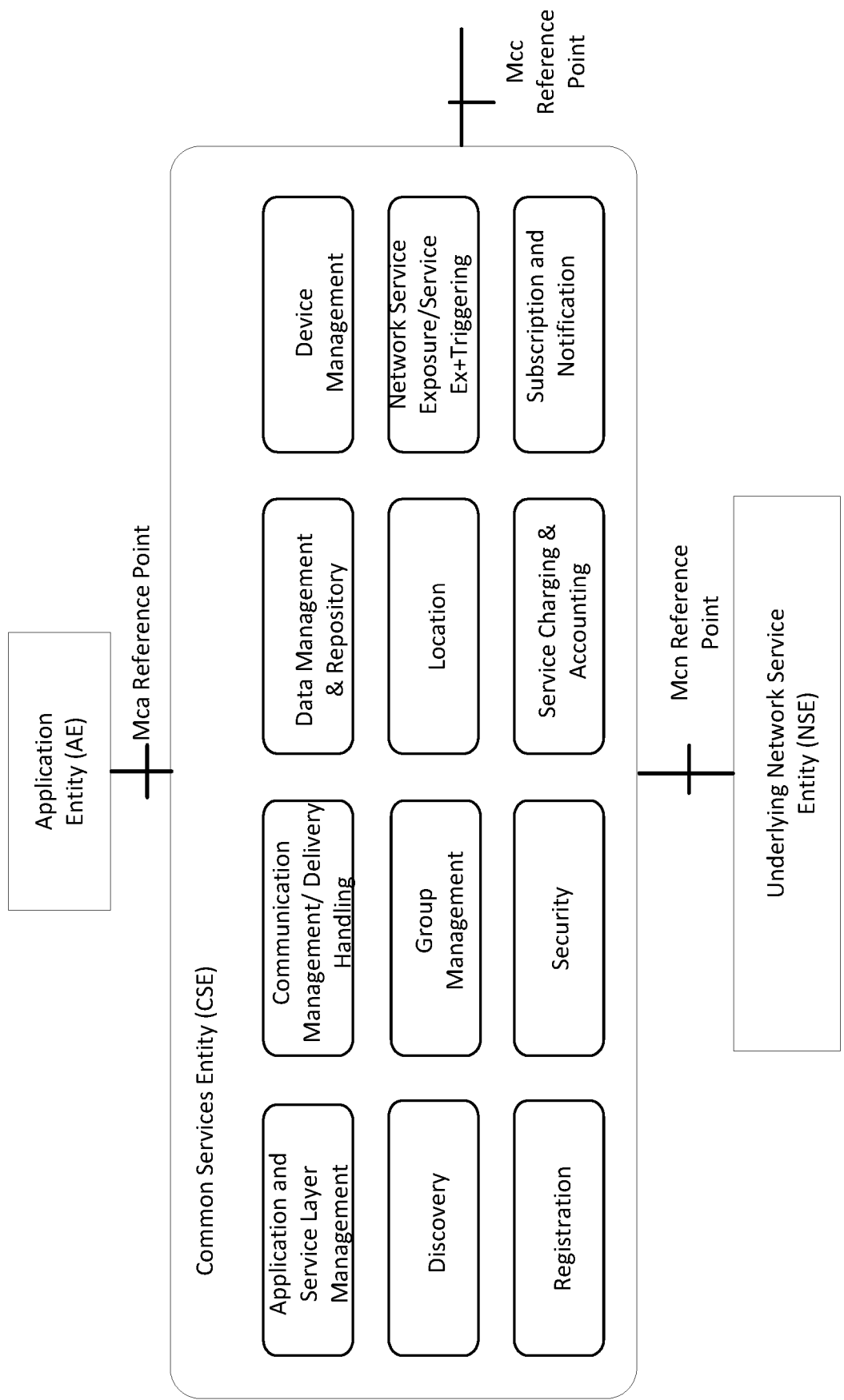
FIG. 3 illustrates an exemplary oneM2M Common Service Functions.
Figure 4:
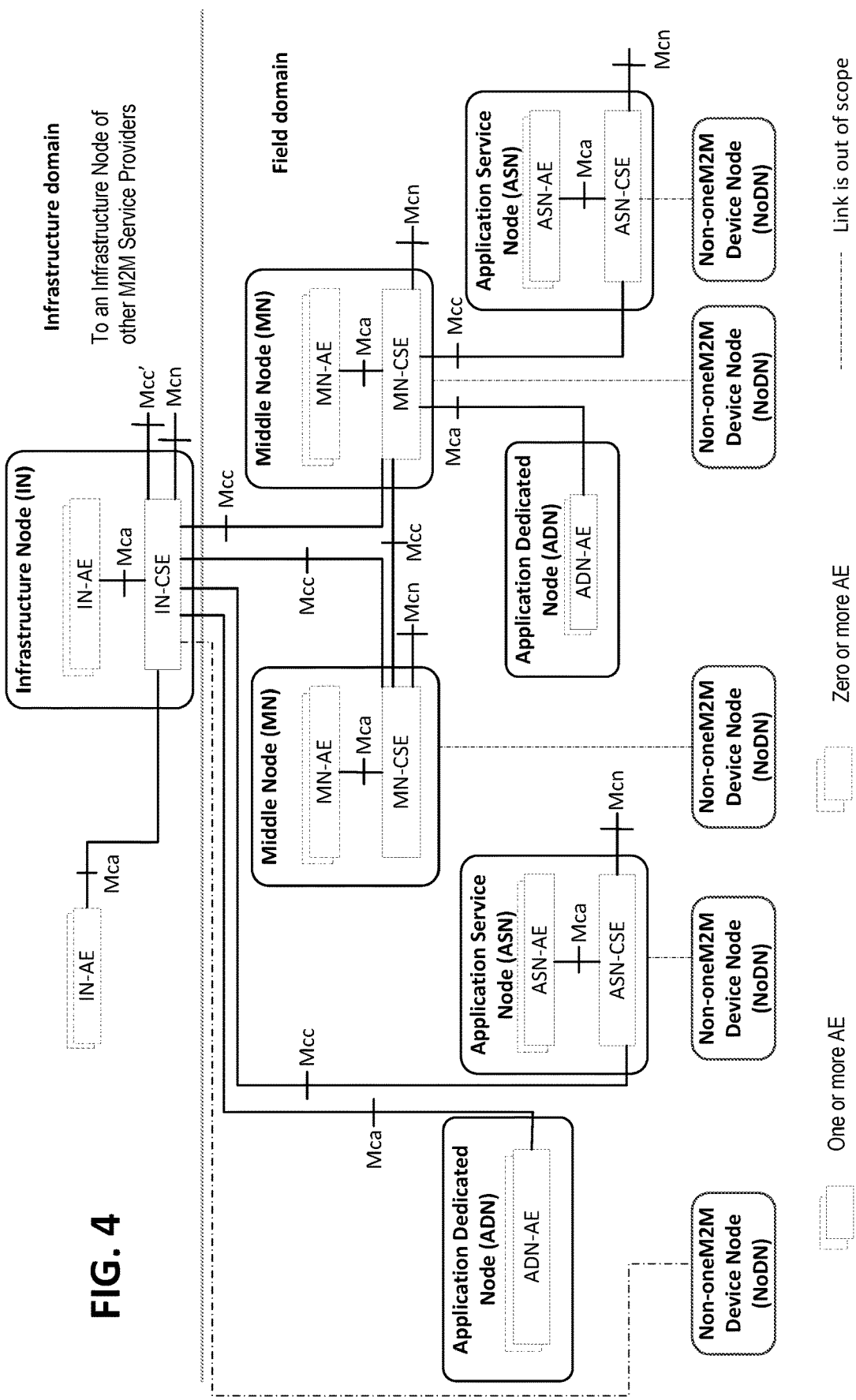
FIG. 4 illustrates configurations supported by oneM2M Architecture.
Figure 5:
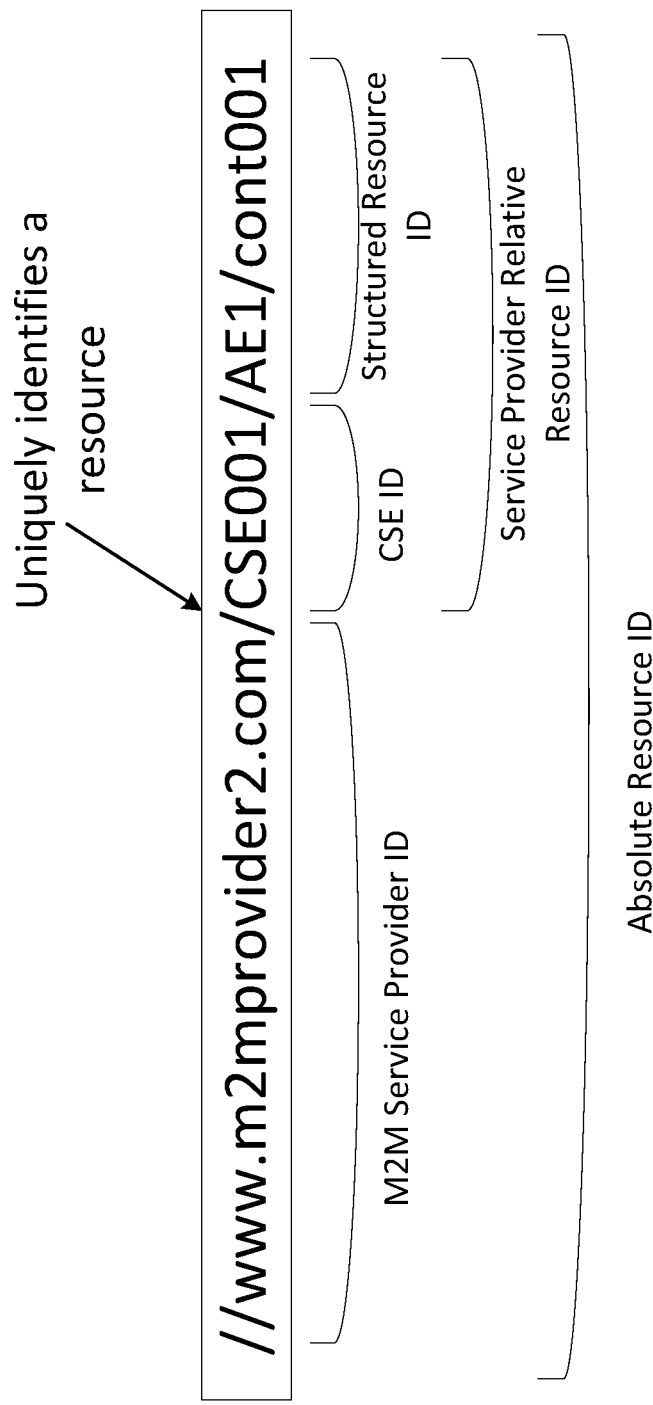
FIG. 5 illustrates an exemplary absolute resource identifier.
Figure 6:
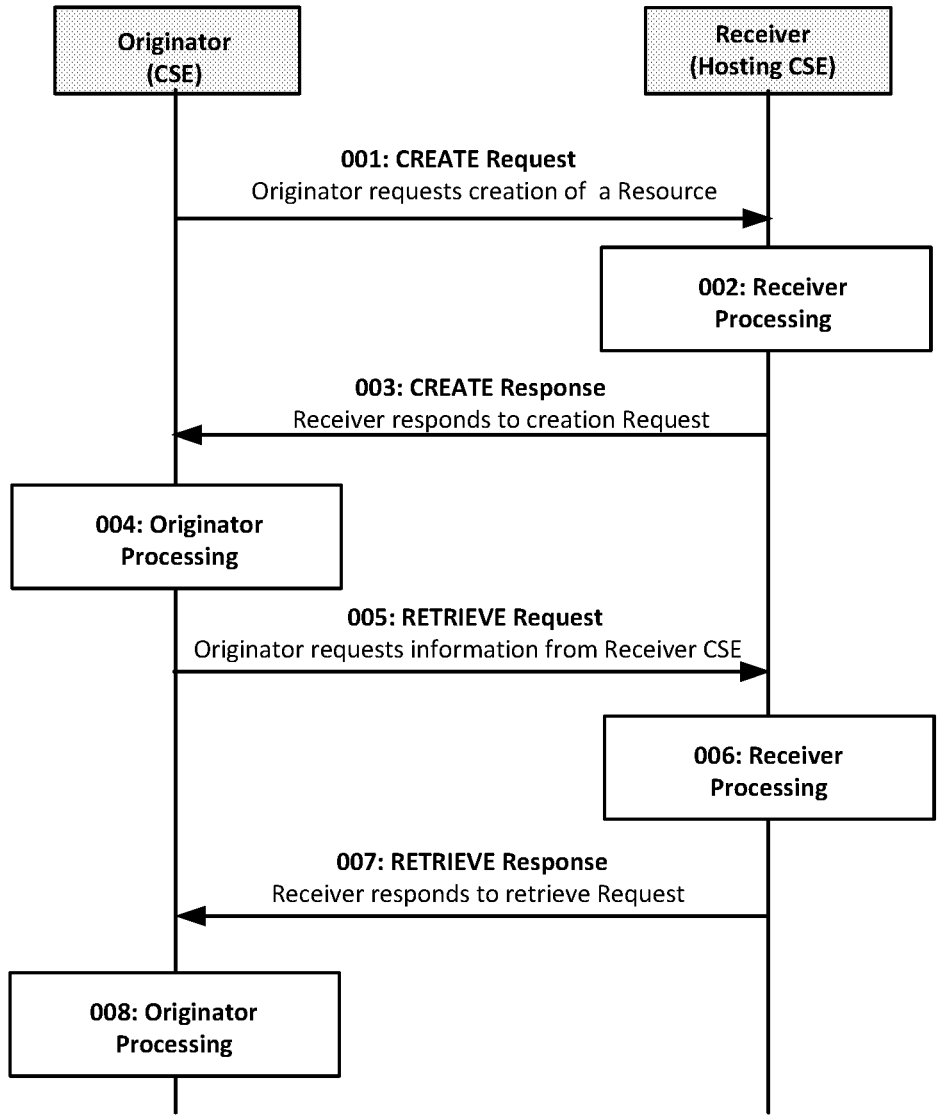
FIG. 6 illustrates an exemplary oneM2M CSE Registration procedure.
Figure 7A:
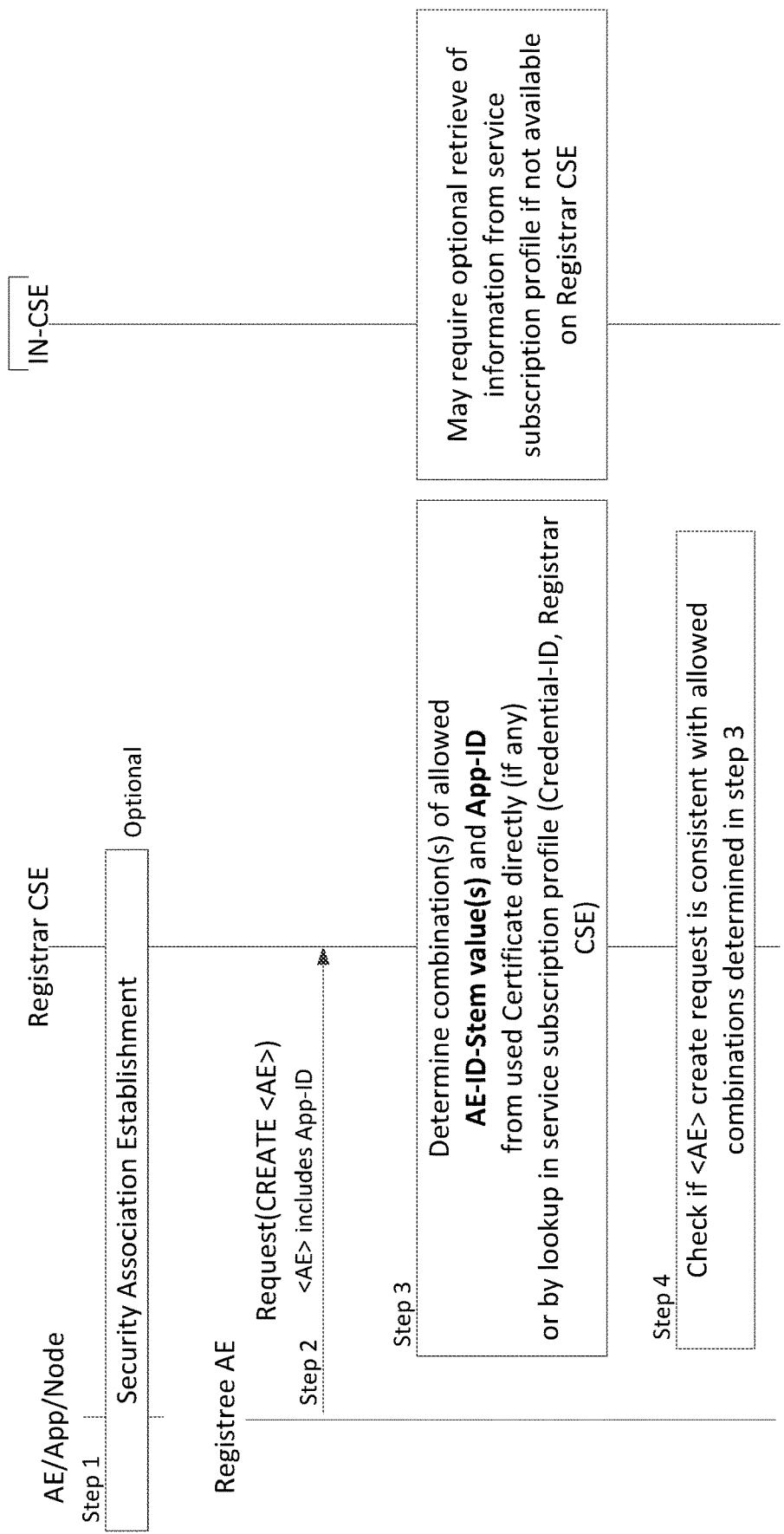
FIG. 7A-FIG. 7C illustrates an exemplary oneM2M procedure for creating an <AE> Resource.
Figure 7B:
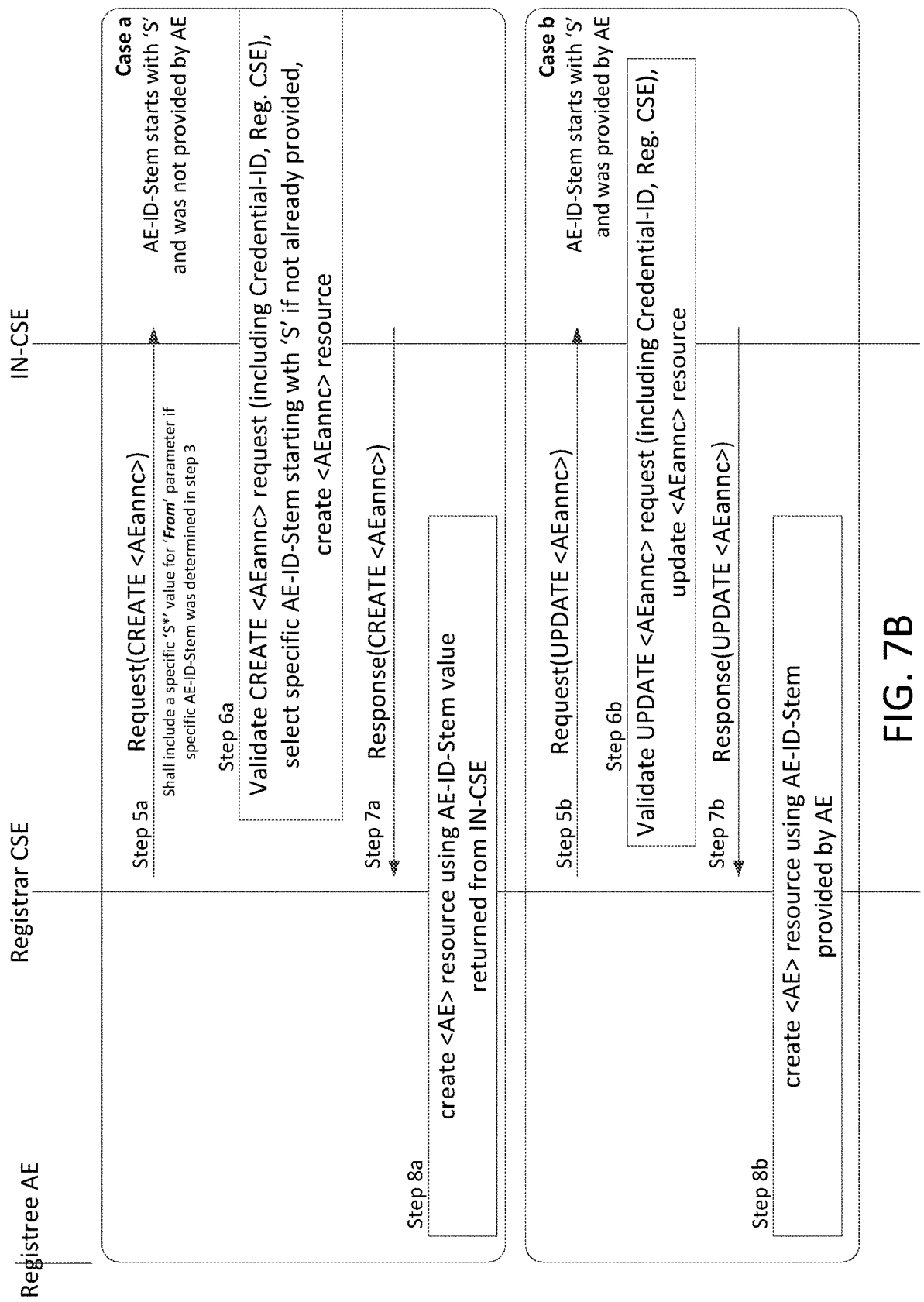
Figure 7C:
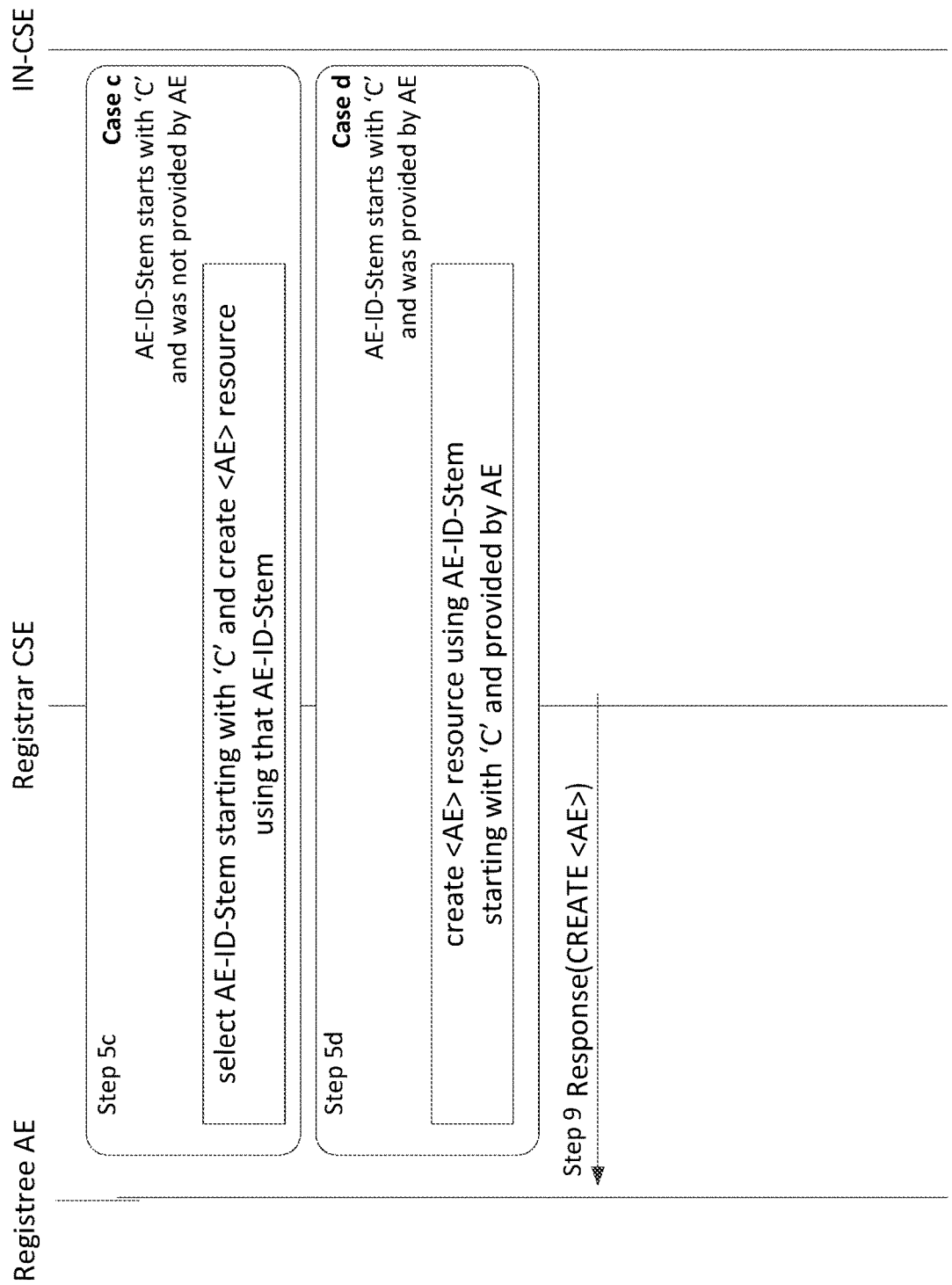
Figure 8:
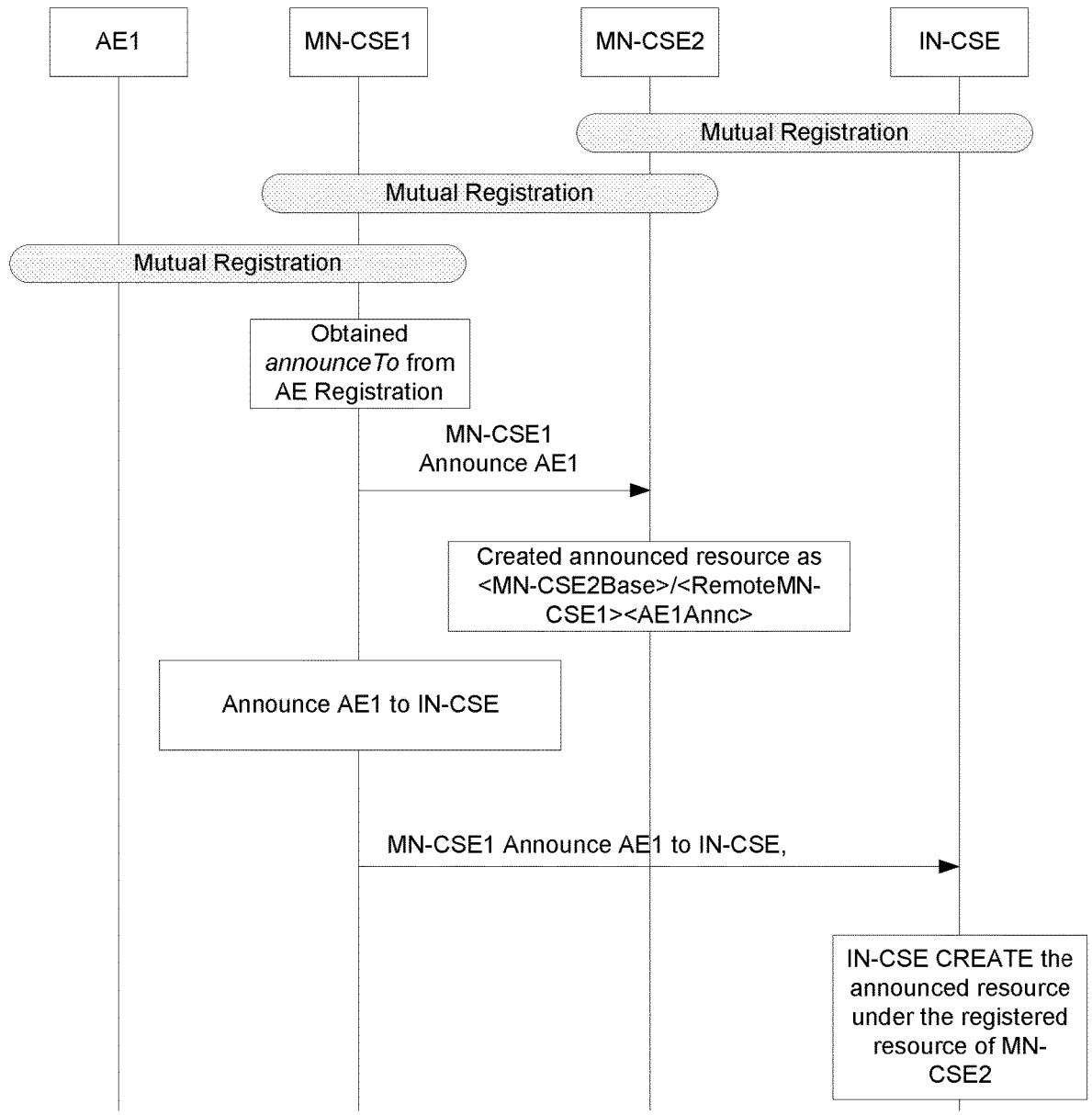
FIG. 8 illustrate an exemplary procedure for announced resource discovery in oneM2M Architecture.
Figure 9:
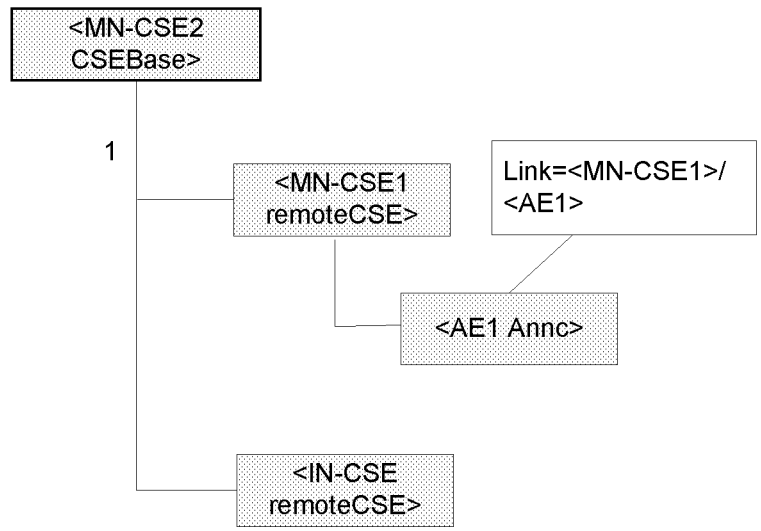
FIG. 9 illustrates an exemplary Announced Resource at MN-CSE 2.
Figure 10:
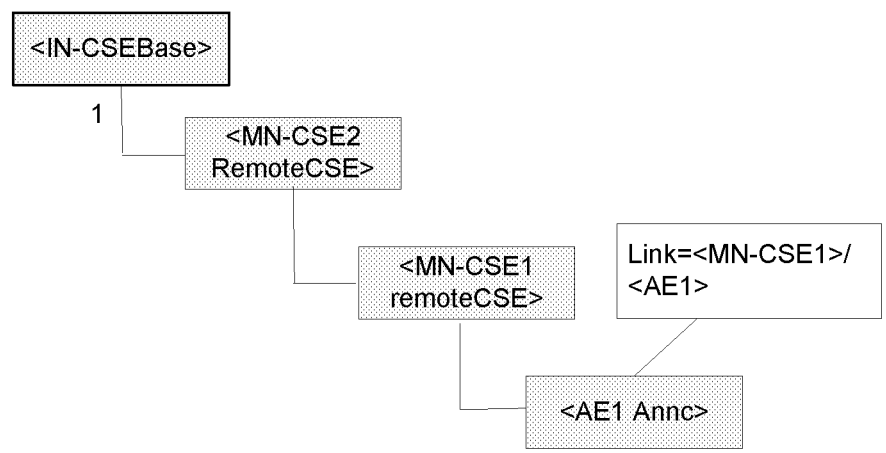
FIG. 10 illustrates an exemplary Announced Resource at IN-CSE.
Figure 11:
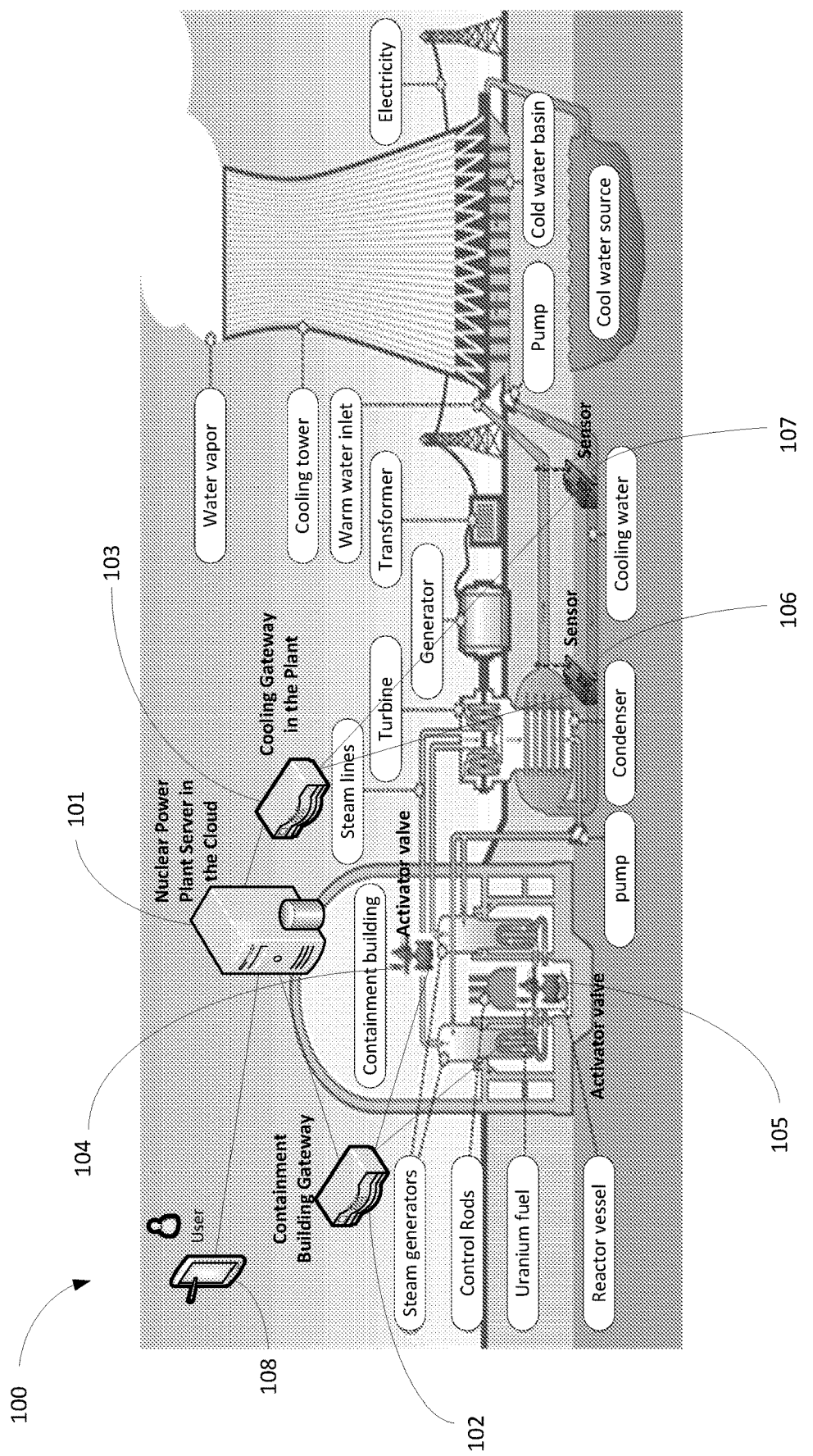
FIG. 11 illustrates an exemplary M2M/IoT industrial network deployed by a service provider.

Discussed below is an exemplary use case to give additional perspective to issues with regard to enabling reliable and continued distributed M2M/IoT services. FIG. 11 illustrates an exemplary M2M/IoT industrial network deployed by a service provider for a nuclear power plant. Conventionally, actuators and sensors, which may be constrained devices, are required to register to M2M/IoT gateways to provide control and monitoring service(s). For example, actuator valve 104 or actuator valve 105 registers to gateway 102 in the containment building to control the streamflow of the fluid in the tube. In another example, temperature sensor 106 or temperature sensor 107 registers to gateway 103 in the cooling building to report temperature of the fluid in the tube. These M2M/IoT gateways (e.g., gateway 102 or gateway 103) are usually deployed inside of the power plant in order to provide quick response and fast control. The M2M/IoT gateways may register directly to M2M/IoT server 101, which may be deployed in the cloud in order to provide reliable service to an end user device (e.g., device 108), which may be operated by a plant administrator. Service reliability and continuity may be essential features for industrial networks. In other words, when gateway 102 becomes non-functional, the services provided in the system should not be significantly interrupted. For example, if gateway 102 for the containment building is down, actuator 104 should still receive the request from device 108 which may be used by an administrator. As another example, if gateway 103 in the cooling building is down, device 108 operated by the administrator should still receive temperature reading from sensors. Otherwise, a catastrophic event may happen.

Figure 12:
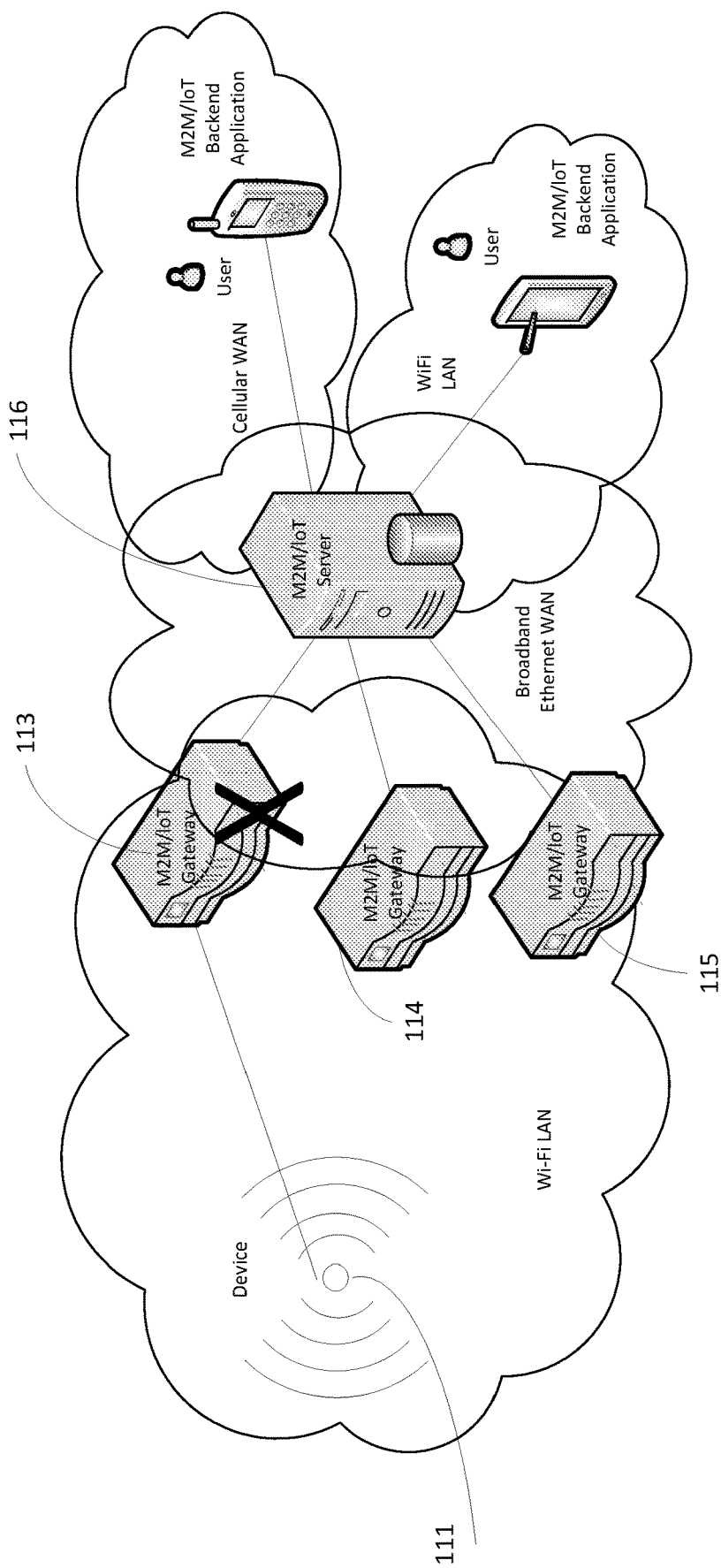
FIG. 12 illustrates an exemplary gateway down condition that may interrupt services associated with the device.

In a M2M/IoT service layer for an industrial network, as shown in FIG. 11, the gateways, e.g. MN-CSE in oneM2M, are usually deployed locally or at the edge of a network to provide prompt service. Now with reference to FIG. 12, a constrained device, e.g. device 111, may have initially registered to gateway 113 to provide service. At some time after the aforementioned registration of device 111, gateway 113 may be down due to an unexpected event as shown in FIG. 12. After device 111 detects gateway 113 is down, it may start a service discovery to find gateway 114. Thereafter, when operating in a conventional system, device 111 may have to start a new registration procedure to register to gateway 114 to provide service.

There are several problems associated with the conventional procedure described above. First, during this switching period, device 111 may not provide service to the system (e.g., the service is interrupted). Second, after the new registration, there is a lack of service continuity in the system. The SL context maintained in gateway 113 for both its registered devices (e.g., device 111) as well as the backend applications that communicate with these devices via gateway 113 may be lost or unavailable since gateway 113 goes out of service and the new registration created at gateway 114 does not include the SL context from gateway 113. In conventional systems, SL reliability and continuity of service may not be supported to enable another gateway (e.g., gateway 114) to provide seamless service to device 111 when gateway 113 goes down. As a result, device 111 may be burdened with having to discover and register to a new gateway (e.g. gateway 114 or gateway 115) and re-establish its SL context with this new gateway (e.g., gateway 114). Likewise, backend applications must discover the new gateway that devices (e.g., device 111) register to and re-establish their SL context (e.g. subscriptions to devices) with the new gateway.

A way to achieve reliability and continuity requirements may be for device 111 to register to multiple gateways (e.g., gateway 113 and gateway 114) and device 111 may send duplicated requests to these gateways to keep SL context synchronized on the gateways (e.g. gateway 113 and gateway 114). However, this possible way to resolve puts extra overhead into device 111, which may not be suitable for constrained devices in M2M/IoT systems. Below, a method is disclosed to achieve reliable and continued distributed service when a SL entity at the edge of the network is non-functional. In this method, an enhanced registration procedure is disclosed herein to allow one active and multiple inactive SL registrations to be created at different SL for an application entity without adding significant overhead and burden to an application entity. After the registration procedure, the active SL registrar entity provides services to the application entity. Moreover, the active SL registrar entity keeps the SL context synchronized on inactive SL registrar entity(s) for the registree entity using procedures described in herein. When the active SL registrar entity is non-functional, one of the inactive SL registrar entity(s) may take over and become the active SL registrar entity and avoid service interruption using procedures as described herein. When a SL entity recovers from a failure, a new procedure is disclosed to enable the SL entity to provide reliable and continued service to other SL entities as described herein.

In summary, disclosed herein is an exemplary method to achieve reliable and continued distributed service when a SL entity in the network (e.g., on the edge of the network) is non-functional. Disclosed below is an enhanced registration procedure that may allow one active and multiple inactive SL registrations to be created at different SL for an application entity without adding significant overhead and burden to an application entity. After the registration procedure, the active SL registrar entity may provide services to the application entity. Moreover, the active SL registrar entity keeps the SL context synchronized on inactive SL registrar entity(s) for the registree entity using procedures described herein. When the active SL registrar entity is non-functional, one of the inactive SL registrar entity(s) may take over and become the active SL registrar entity and avoid service interruption using procedures as described herein. When a SL entity recovers from a failure, a new procedure may be used to enable the SL entity to provide reliable and continued service to other SL entities as described herein.

Disclosed below is an enhanced application entity registration procedure to allow one active and one or more inactive application entity registrations to be created at different SL entities without adding significant overhead and burden to the application entity. In order to describe the disclosed procedure, SL entities (e.g., gateway 113 and server 116) and application entity (e.g., device 111) in FIG. 12 are used as an example. Gateway 113 or gateway 114 may have registered to server 116 (which may be a M2M/IoT server). Device 111 may have initially registered to gateway 113 using the disclosed procedure as shown in FIG. 13.

Figure 13:
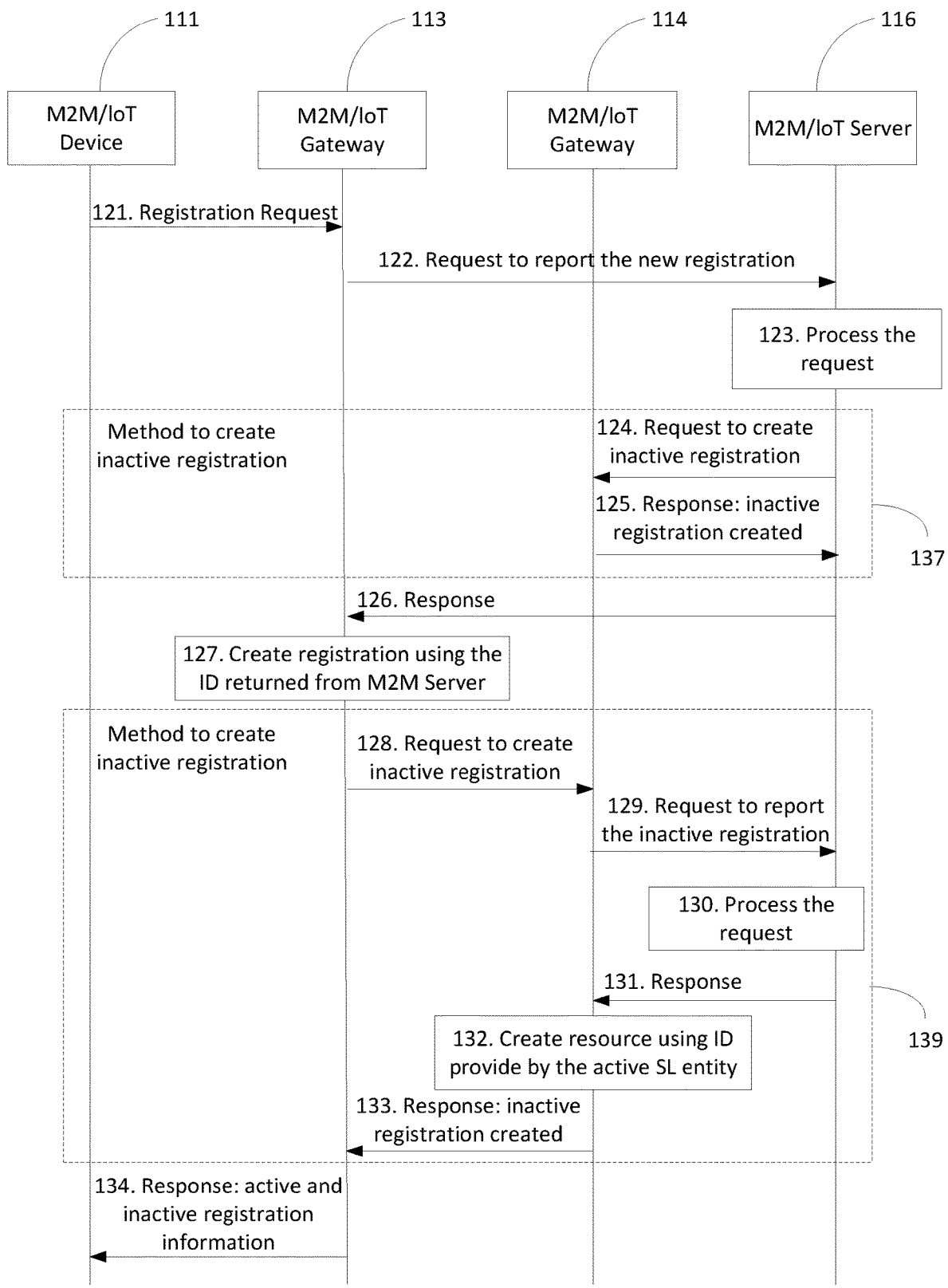
FIG. 13 illustrates an exemplary registration procedure to create backup registration.

FIG. 13 illustrates an exemplary registration procedure to create backup registration. At step 121, device 111 (also referred to herein as registree entity 111), may send a registration request message to gateway 113 (e.g., registrar entity 113). The registration request message may include the requirement of the service reliability or other information of Table 1. In one example, registree entity 111 may indicate whether it requires a reliable service from the service layer. Registree entity 111 may also indicate other service reliability preferences or requirements, such as the minimum reliability of the service, number of inactive service layers it requires, or the list of the inactive registrar entities to provide reliable service. Table 1 lists fields that may be in a registration request message of step 121. Registree entity as disclosed herein is commonly the end device (e.g., sensor 106 or actuator 105, device 111), but may be another device as well, while the registrar entity as disclosed herein is commonly a gateway (e.g., gateway 113, gateway 102, or gateway 103), but may be another device as well.

At step 123, server 116 may generate a unique SL ID within the service provider domain for device 111. Server 116 may then store the registration information as shown in Table 2. For example, gateway 113 is an active registrar entity of device 111 as shown in Table 3. If the request includes the preference of service reliability, the server 116 may, based on the use of the information that is listed in Table 1, determine and provide a list of inactive registrar entities to provide the reliable and continued service. For example, if the requested service reliability is 0.9999, and the reliability of gateway 113 is 0.99, server 116 may choose a SL entity with reliability higher than 0.9999 or two SL entities with reliability higher than 0.99 as the inactive registrar entity for the registree in the service provider domain. In order to achieve this, server 116 may keep track of the performance metrics (e.g., reliability) of SL entities in the service provider, such as how often a SL entity is non-functional by using procedures as disclosed herein.

With continued reference to FIG. 13, if the request of step 121 (or step 122) does not include a service reliability requirement, server 116 may check the other parameters in the request or the service provider policy provisioned in the system (if present). If rules are configured that reliability is needed for the particular device or type of device, server 116 may determine a list of inactive registrar entity(s) capable of providing the reliable and continued service based on the other parameters in the request or the pre-defined requirement. Server 116 may create inactive registrations on behalf of device 111 using step 124 to step 125. Server 116 may include the list of selected inactive registrar entity(s) in the response to gateway 113 and may indicate gateway 113 to create inactive registrations on behalf of device 111 following step 128 to step 133.

Block 137 is a first example of method steps to create an inactive registration. At step 124, server 116 may send a request to create an inactive registration on gateway 114 on behalf of device 111. The registration request message of step 124 may include the SL ID of the registree entity

TABLE 1

New Fields in a Registration Request Message

| Field Name | Description |
| --- | --- |
| Reliable Service Indication | May indicate whether the registree entity requires a Service Layer to provide reliable and continued service. |
| Minimum Service Reliability Requirement | May indicate the required level (e.g., minimum threshold) of service reliability. For example, the service should be interrupted with the probability less than 0.000001. |
| Number of inactive SL | May be the number of inactive service layers required. |
| Service Requirements | Services that are required to be available from the inactive SL. |
| SL Identifiers | Identifier(s) of SL's that the registree requests to create inactive registrations on. For example, identifier of gateway. |
| SL Characteristics | Specific characteristics that are requested of the inactive SL's. For example, this field may indicate a request for location, owner, or charging model. |

At step 122, subsequent to receiving the registration request message of step 121, gateway 113 may send a request to report this registration to server 116, which may include the SL ID of gateway 113 and indicates this is an active registration. Gateway 113 may also include the service reliability requirement of device 111 as shown in Table 1, such that server 116 may provide a list of inactive registrar entities to provide the reliable and continued service.

(device 111 in this example) and the active registrar entity (e.g., gateway 113). Table 4 lists fields that may be included in a registration request message, such as in step 124. At step 125, gateway 114 may send a response to server 116 that indicates the inactive SL registration has been created. After receiving the response, server 116 may store the registration information in the registration management table as shown in Table 5.

TABLE 2

Registration Information Entry in Registration Management Table in a M2M/IoT Server

Figure 14:
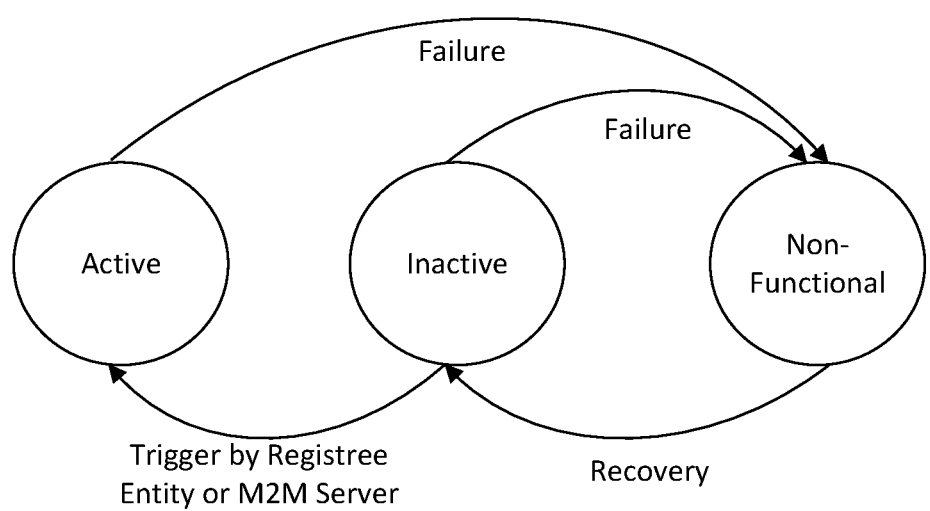
FIG. 14 illustrates an exemplary Registrar Entity State Transfer Diagram.

| Field Name | Description |
|---|---|
| Registree Entity ID | The SL ID of the Registree Entity, e.g. device 111 |
| Registrar Entity ID | The SL ID of the Registrar Entity, e.g. gateway 113 |
| Registrar Entity Status | The status of the active registrar entity of the registree entity. For example, an active status may indicate the registrar entity is actively providing services for the registree entity. An inactive status may indicate the registrar entity serves as an inactive (e.g., backup) SL for the registree. A non-functional status may indicate the registrar entity cannot provide one or more services for the registree entity. FIG. 14 describes a state transfer diagram between these statuses. An active or inactive registrar entity may become a non-functional registrar entity if it fails to provide service as described herein. When a non-functional registrar entity recovers from a failure, it may become an inactive registrar entity via the procedure described herein. An inactive registrar entity may become an active registrar entity if triggered by a registree entity or M2M Server when an active registrar entity is unavailable as described herein. |
| Registrar Entity Reliability | The reliability metric of the registrar entity, for example, the entity has reliability of 0.999. |

At step 126, server 116 may send a response to the active registrar entity, e.g., gateway 113. The response message may include the unique ID for the registree entity. The response may include the list of inactive registrar entities that have been created in step 124 to step 125. The response may include a list of inactive SL registrar entities that meet the reliability requirement of the registree entity, and indicate gateway 113 to create inactive registrations on behalf of device 111 following step 128 to step 133.

TABLE 3

Registration Management Table in a M2M/IoT Server

| Registree Entity ID | Registrar Entity ID | Status | Reliability |
|---|---|---|---|
| device 111 | gateway 113 | Active | 0.99 |

At step 127, based on receiving the response, the active registrar entity (e.g., gateway 113) may create the SL registration for device 111. If server 116 already created the registree entity 113, then server 116 may store the inactive registrar entities as shown in Table 5. Otherwise, based on the inactive SL Registrar entities list generated by itself, provided by M2M/IoT device 111 or the server 116, the active registrar entity (e.g., gateway 113) starts a registration procedure to create inactive SL registrations on behalf of device 111 at the inactive SL registrar entities (e.g., gateway 113 creates an inactive SL registration at gateway 114, on behalf of device 111).

With continued reference to FIG. 13, block 139 is a second example of a method to create inactive registration. At step 128, gateway 113 may send a request to create an inactive registration on gateway 114 on behalf of device 111. The registration request message may include the SL ID of the device 111 (e.g., the registree) and the active registrar entity (e.g., gateway 113). Table 4 lists fields that may be included in a registration request message, such as step 128. At step 129, gateway 114 may send a request to report the inactive registration of step 128 to server 116, which may include the SL ID of the device 111 (e.g., registree), SL ID of the inactive registrar entity (e.g., gateway 114), or an indication that the request of step 128 is for an inactive registration.

TABLE 4

Fields in Registration Request Message to Create a Backup Registration

| Field Name | Description |
|---|---|
| Inactive Registration Indication | Indicate to create an inactive registration |
| Registree Entity | The SL ID of the Registree Entity. |
| Active Registrar Entity | The SL ID of the Active Registrar Entity. |

At step 130, server 116 may then store the registration information. Table 2 provides an example of registration information. For example, gateway 114 may be an inactive registrar entity of the device 111, and may not provide active SL for device 111 now as shown in Table 5.

TABLE 5

Registration Management Table in a M2M/IoT Server and Gateway After Inactive Registration Creation

| Registree Entity ID | Registrar Entity ID | Status | Reliability |
|---|---|---|---|
| device 111 | gateway 113 | Active | 0.99 |
| device 111 | gateway 114 | Inactive | 0.9999 |

Comparison of registrars may be based on factors such as reliability, registrar load, location, owner, hardware model, etc. At step 131, server 116 may send a response to the inactive registrar entity (e.g., gateway 114). At step 132, after receiving the response, the inactive registrar entity (e.g., gateway 114), creates the inactive SL registration for the registree entity (e.g., device 111). After the inactive registration, gateway 114 acts as an inactive SL for device 111. Gateway 114 may provide active services for device 111 when gateway 113 is non-functional. An example, of how to trigger the inactive SL to provide active services for the registree entity is described herein. At step 132, gateway 114 may send a response to the active registrar entity. After receiving the response, gateway 113 may store the registration management table as shown in Table 5.

At step 134, gateway 113 may send a response to device 111 that the active and inactive SLs have been assigned. The response message may include the information of inactive SL registrar entities as shown in Table 5. The response message may also indicate whether to allow the registree entity to select and trigger an inactive SL registrar entity to become an active SL registrar entity as described herein.

Alternatively, in the case where the inactive SL registrar entities list is generated locally at gateway 113 or is provided by the server 116, gateway 113 may provide this list to the M2M device 111 in a registration response. The M2M device 111 may then select which of these entities it wants to use for reliable service, and initiate an "inactive" registration with the inactive SL registrar entities.

As another alternative, step 128 shows gateway 113 communicating directly to gateway 114 to create the inactive registration. As gateway 113 and gateway 114 have no registration relationship, this may be accomplished by: 1) Having the message exchanges flow through the M2M server (which has a registration relationship with both gateway 113 and gateway 114); or 2) Trigger gateway 113 to register to gateway 114. This may facilitate the transfer of the inactive registration request and also the service layer synchronization described herein.

Figure 15:
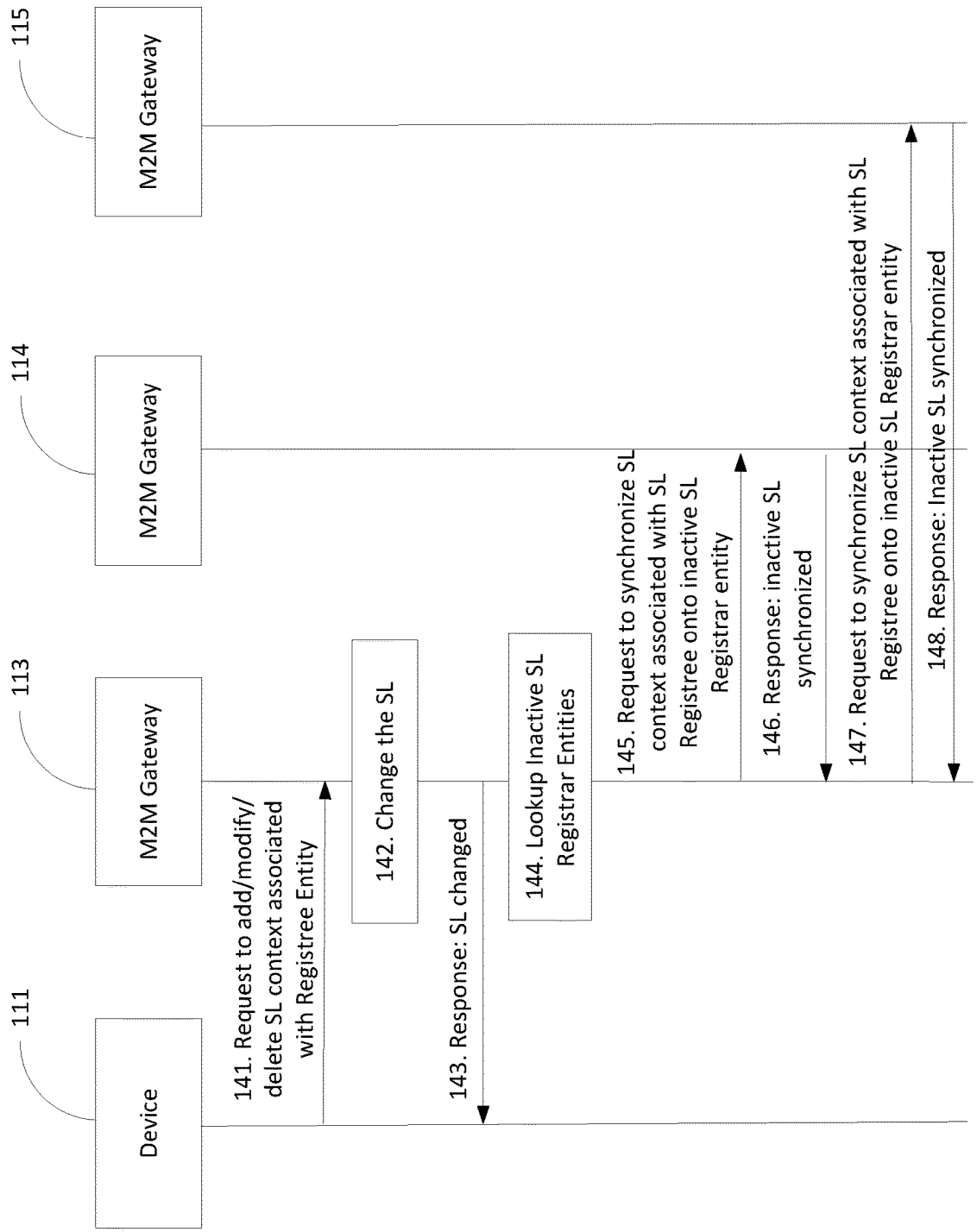
FIG. 15 illustrates exemplary Service Layer Synchronization between Registrar Entities.

It is understood that the entities performing the steps illustrated herein, such as FIG. 13-FIG. 21 and FIG. 28-FIG. 29, may be logical entities. The steps may be stored in a memory of, and executing on a processor of, a device, server, or computer system such as those illustrated in FIG. 32C or FIG. 32D. In an example, with further detail below with regard to the interaction of M2M devices, device 111 of FIG. 17 may reside on M2M terminal device 18 of FIG. 32A, while gateway 113 of FIG. 17 may reside on M2M gateway device 14 of FIG. 32A. Skipping steps, combining steps, or adding steps between exemplary methods disclosed herein (e.g., FIG. 15-FIG. 21 and FIG. 28-FIG. 29) is contemplated Disclosed below are procedures to make the SL context associated with a registree entity at the inactive registrar entity(s) synchronized with the active registrar entity. Such that when the inactive registrar entity becomes an active registrar entity, it may continue providing services for the registree entity without loss of service or introducing significant overhead on the registree entity to re-establish service. In a first procedure, the active SL efficiently may keep an inactive SL synchronized with context information of the registree entity. In order to describe the disclosed procedure, SL entities in FIG. 12 may be used as an example. In FIG. 15, device 111 has an active registration to gateway 113 (active registrar entity) and inactive registrations to gateway 114 and gateway 115 (inactive registrar entities). When gateway 113 receives a SL request to add/modify/delete SL context associated with the registree entity (device 111), it follows the procedure in FIG. 15 to synchronize gateway 114 and gateway 115 with this same context.

With reference to FIG. 15, at step 141, device 111 may send a request to the active SL registrar entity, e.g., gateway 113, to add, modify, or delete SL context associated with the SL registree entity, e.g., device 111. This request may originate from device 111 or another SL entity. At step 142, after receiving the request, gateway 113 may add, modify, or delete the SL context information associated with the device 111 based on the request. At step 143, gateway 113 may send a response to device 111 to confirm the change.

At step 144, gateway 113 may look up the list of inactive registrar entities associated with the registree entity (e.g., device 111). Gateway 113 may know this information when the device 111 creates an active registration based on a registration management table, such as in Table 5. This table may be stored locally on gateway 113 or on server 116. If stored on server 116 only, then the gateway may access server 116 to retrieve this information. Gateway 113 may also obtain this information when it becomes an active registrar entity for the device 111 by retrieving registration management table (e.g., Table 5 or the like) stored in in server 116. Based on the reliability requirement of the device 111, the active registrar entity (e.g., gateway 113) may select a subset of inactive registrar entities to synchronize.

At step 145, gateway 113 may send a request to one of inactive registrar entities (e.g. gateway 114) to synchronize SL resource associated with device 111 as the registree. Based on the reliability requirement (or other requirement as disclosed herein) of device 111, gateway 113 as the active registrar entity may determine the frequency of the synchronization request. For example, if device 111 needs real-time service continuity, the active registrar entity (e.g., gateway 113) may send the synchronization request for every SL context change associated with device 111. As another example, if device 111 does not need stringent service continuity, the active registrar entity (e.g., gateway 113) may reduce the frequency of the synchronization request, or send the request during off peak hours or piggy it back with other request messages to the inactive registrar entity (e.g., gateway 114).

Based on the reliability requirement (or other requirements) of device 111, gateway 113 may determine the context in the synchronization request of step 145. The request of step 145 may contain, but is not limited to, the updated information about network address (IP addresses, Ports, Supported transport protocols), Security IDs and Credentials, SL registration state (SL IDs, point of contact info), SL Subscription information (e.g., service another SL entity subscribed), SL announcement context, application centric data and device management state. For example, if the registree entity requires continued subscription service, the active registrar entity contains the SL subscription information updated in the synchronization request to the inactive registree entity.

At step 146, gateway 114 may send the response to gateway 113 to confirm the synchronization. If the response indicates failure, or if no response is received, then gateway 113 may consider gateway 114 to be non-functional for device 111 as the registree. Gateway 113 may notify device 111 and server 116 that the inactive registration on gateway 114 is non-functional. A procedure disclosed herein may be triggered to handle this situation of non-functional inactive registration. At step 147, gateway 113 may send a request to other inactive registrar entities, e.g. gateway 115, to synchronize SL resources associated with device 111 as in step 145. At step 148, gateway 115 may send a response to gateway 113 to confirm the synchronization as in step 146.

In the second procedure, server 116 assists the synchronization process to reduce the overhead for both active and inactive registrar entities. In this procedure, gateway 113 synchronizes itself with server 116 rather than one or more inactive registrar entities. Server 116 may use this information to synchronize an inactive registrar entity periodically or when the inactive registrar entity transitions from inactive to active. Similarly, gateway 113 and server 116 may determine the frequency and context information to synchronize as described in the first procedure. If server 116 fails to successfully synchronize an inactive registration, it may inform gateway 113 or device 111, as the registree, that the inactive registration is now non-functional. A procedure disclosed herein may be triggered to handle this situation of non-functional inactive registration.

Disclosed below is registree entity centric and M2M Server centric procedures that may provide reliable and continued service when an active SL layer entity is non-functional. When the active SL registrar entity (e.g., gateway 113) becomes non-functional, one of the inactive SL registrar entities (e.g., gateway 114 or gateway 115) may take over and become the active SL registrar entity to avoid service interruption.

Figure 16:
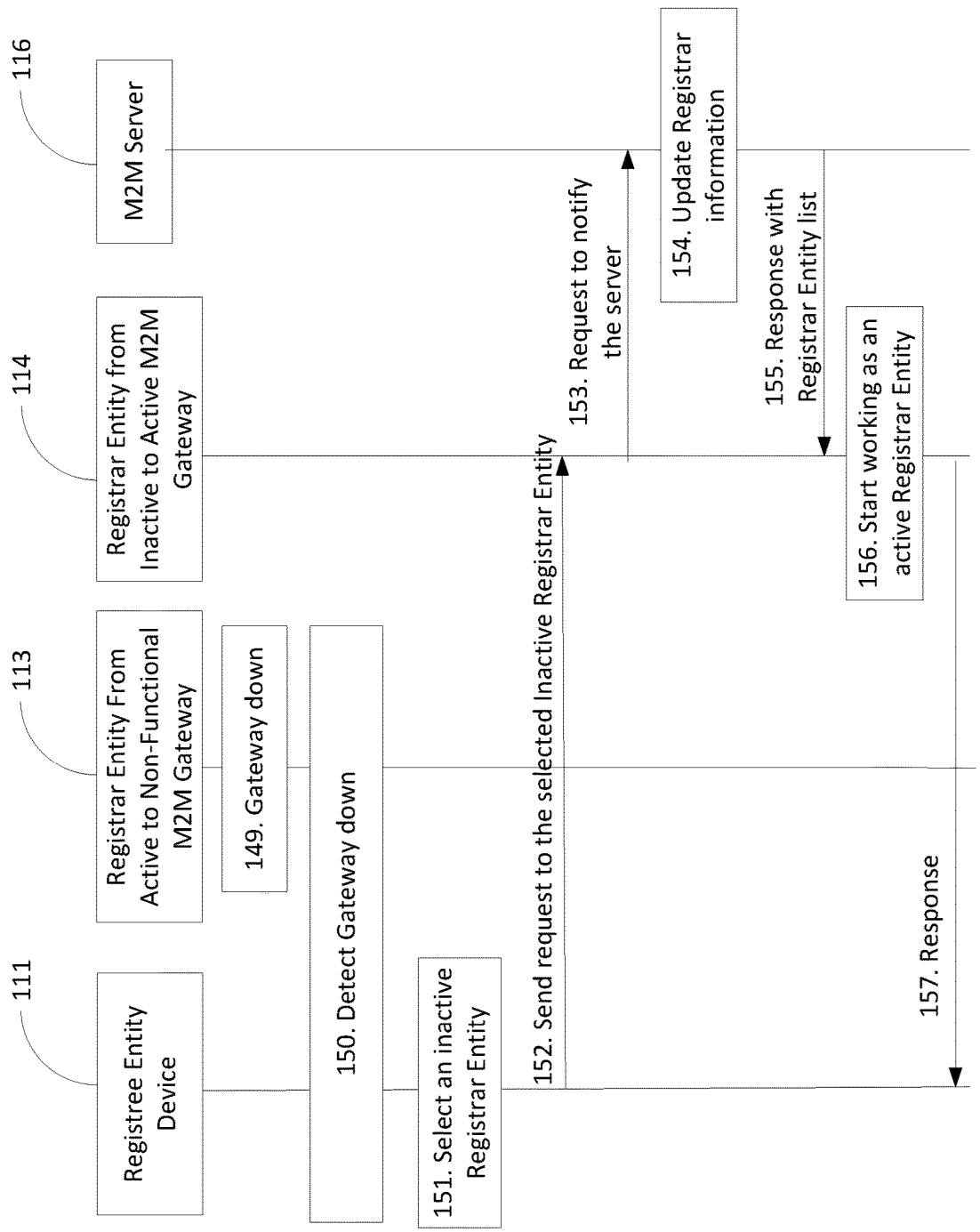
FIG. 16 illustrates an exemplary Registree Entity Centric Procedure for a Registree Entity to Trigger an Inactive SL Registrar Entity to Take over and Become the Active SL Registrar Entity.

A registree entity centric procedure is disclosed below for a registree entity to trigger an inactive SL registrar entity to take over and become the active SL registrar entity when the registree entity itself detects its SL registrar entity is non-functional. In order to describe the procedure, SL entities of FIG. 12 are used as an example. In FIG. 16, gateway 113 is functioning as the active SL for device 111 (the registree) and gateway 114 is functioning as the inactive SL for device 111. If gateway 113 becomes non-functional (e.g., step 149), device 111 may detect this event (e.g., step 150) when it fails to receive a response message or a scheduled service message, e.g. a heartbeat message, from gateway 113. If this occurs, then device 111 may follow the procedures as described with regard to FIG. 16 to achieve the level of reliable and continued service it requests. Alternatively, device 111 may decide that gateway 113 has become non-functional when it detects that response from gateway 113 are generally slow or a message may be received that gateway 113 may become non-functional at some future time; this message may come from gateway 113 or it may come from another device (e.g., systems administrations message).

With continued reference to FIG. 16, at step 151, device 111 may select one of its inactive registrar entities to provide it with service. The selection may be based on information that was provided to device 111. For example, device 111 may randomly select an inactive registrar among its inactive registrar entities obtained during registration or device 111 may have been provided with a ranking of the inactive registrars. As another example, device 111 may select the inactive registrar that has the highest reliability among its inactive registrar entities obtained during registration (e.g., similar to as shown in Table 5). At step 152, device 111 may send a SL request message to the selected inactive registrar entity (e.g., gateway 114) requesting that its inactive registration become active and indicating that gateway 113 (the formally active registrar entity) is non-functional.

At step 153, gateway 114 may send a request to notify server 116 that it has become the active registrar entity for device 111 and gateway 113 is non-functional. If gateway 114 does not have a SL synchronized with gateway 113 for device 111 as the registree entity when using the second synchronization procedure described herein, gateway 114 may request to synchronize the SL context associated with device 111 on server 116 as described herein. At step 154, based on the request of step 153, server 116 may update the registration information associated with device 111 as shown in Table 6. The status of the gateway 113 may be changed to non-functional and the status of gateway 114 may be changed to active. It is contemplated herein that gateway 113 may not be considered completely non-functional; it may be considered non-functional with respect to its relationship with device 111. However, this message may also cause server 116 to determine that gateway 113 is no longer reliable and the message may trigger it to change other gateway 113's registrations to non-functional; thus moving more registrations from gateway 113 to other gateways as disclosed herein.

At step 155, server 116 may send a response to gateway 114 including the registration management information of all inactive registrar entities associated with device 111. The response may contain the SL synchronization information associated with device 111 if requested by gateway 114. At step 156, gateway 114 may start providing active service for device 111 (e.g., gateway 114) becomes an active registrar entity for device 111. For example, it may synchronize SL context that is associated with device 111 onto the inactive registrar entities as described herein. At step 157, gateway 114 may send a response to device 111 that gateway 114 provides active services for it now. The response message may include the information of inactive SL registrar entities.

TABLE 6

Registration Management Information Stored in a M2M/IoT Server, Gateway or Device after the Procedure

| Registree Entity ID | Registrar Entity ID | Status | Reliability |
| --- | --- | --- | --- |
| device 111 | gateway 113 | Non-functional | 0.99 |
| device 111 | gateway 114 | Active | 0.9999 |

Disclosed below is an M2M/IoT server centric procedure when server 116 detects or is notified a SL entity is non-functional in the same service provider domain. If the non-functional entity was serving as an active registrar entity for a registree entity, the server may trigger an inactive SL registrar entity to take over and become the active SL registrar entity for the registree entity as described below. If the non-functional entity was serving as an inactive registrar entity for a registree entity, the server may trigger a SL entity to become the inactive SL registrar entity as describe below.

Figure 17:
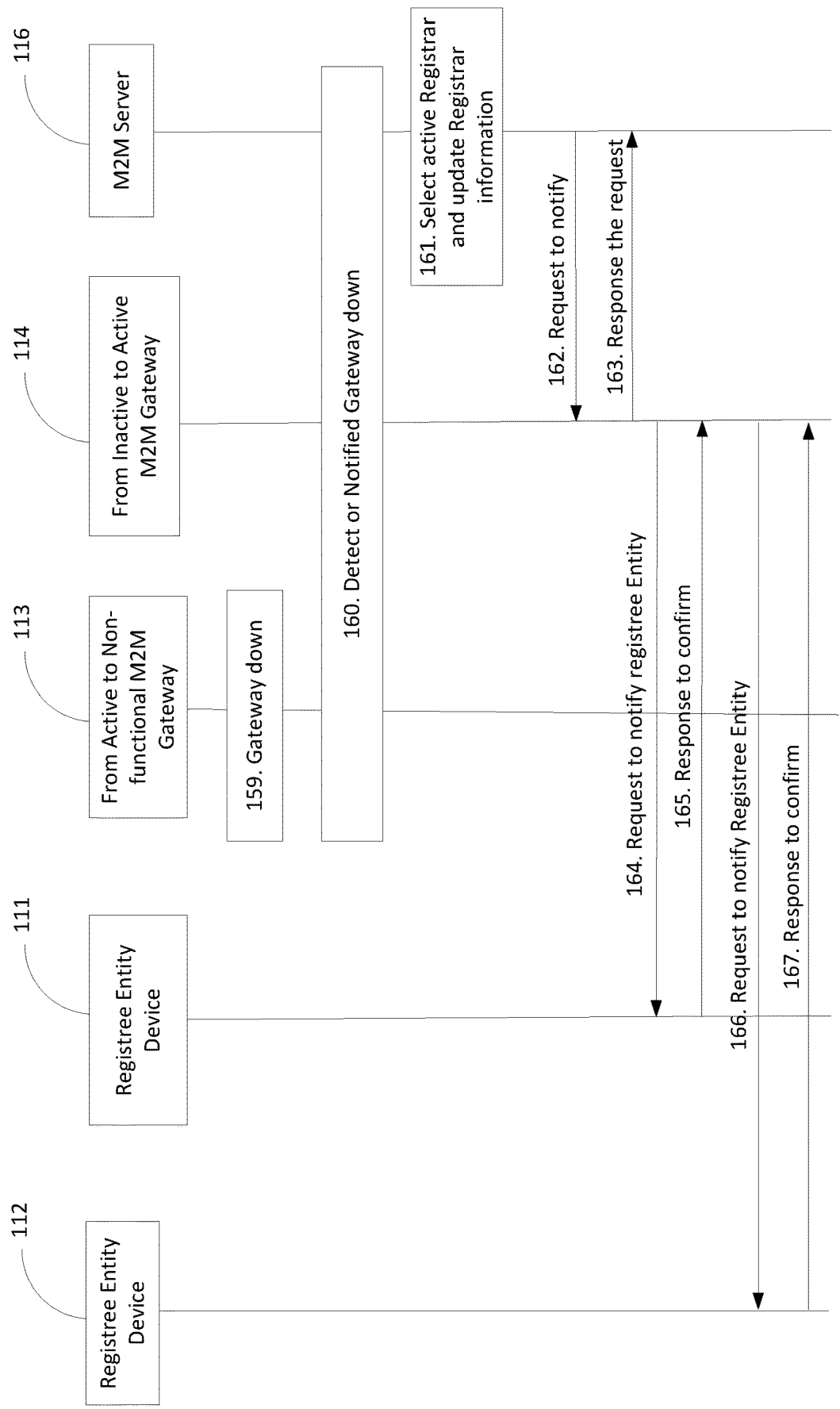
FIG. 17 illustrates an exemplary M2M/IoT Server Centric Procedure to Trigger an Inactive SL Registrar Entity to Take over and Become the Active SL Registrar Entity.

In order to describe the disclosed procedure, SL entities in FIG. 12 are used as an example. In FIG. 17, gateway 113 is initially functioning as the active SL for device 111 and gateway 114 is initially functioning as the inactive SL for device 111. After gateway 113 is non-functional (e.g., step 159), M2M/IoT server 116 may detect gateway 113 is non-functional (e.g., step 160) if it does not receive a response message or a scheduled service message from gateway 113. M2M/IoT server 116 may be notified by other entities that gateway 113 is non-functional as described herein. The M2M/IoT server 116 may also learn, via administrative means, that gateway 113 will become non-functional or should be considered non-functional. When gateway 113 is to be considered non-functional, the M2M/IoT sever 116 may send a request to gateway 113 to verify that gateway 113 is non-functional. The M2M/IoT server 116 may follow the procedure as described with regard to FIG. 17.

At step 161, M2M/IoT server 116 may find each SL entity (e.g. device 111 or device 112) which is using gateway 113 as the active registrar entity based on the registration management information in Table 5, for example. M2M/IoT server 116 may select one of the inactive registrar entities associated with device 111 (e.g. gateway 114) to provide service. The selection method may be based on the information that was provided by device 111 during its initial registration. The information may be a preferred location, owner, operator, charging model, traffic load, etc. For example, M2M/IoT server 116 may randomly select an inactive registrar among its inactive registrar entities in Table 5. As another example, M2M/IoT server 116 may select the inactive registrar that has the highest reliability (or some other information) among its inactive registrar entities in Table 5. M2M/IoT server 116 may then update the registration management information associated with device 111 as shown in Table 6. The status of the gateway 113 may be changed to non-functional and the status of gateway 114 may be changed to active. M2M/IoT server 116 then notifies gateway 114 to become the active registrar entity for device 111. M2M/IoT server 116 may repeat the same process for device 112.

With continued reference to FIG. 17, at step 162, M2M/IoT server 116 may send a request to notify gateway 114 to become the active registrar entity for device 111. If gateway 114 is also selected as the active registrar entity for device 112, the request may also notify gateway 114 to become the active registrar entity for device 112. The request may also include SL context information for device 111, device 112, or other devices. At step 163, gateway 114 may send response back to M2M/IoT server 116. If gateway 114 does not have a SL context synchronized with gateway 113 for the registree entity (e.g., device 111) when using the second procedure regarding synchronization, gateway 114 may request to synchronize the SL context associated with device 111 on server 116 as described herein.

At step 164, based on the request of step 162 from M2M/IoT server 116, gateway 114 may send a request to device 111 to notify that its original active gateway 113 is non-functional, gateway 114 becomes the active registrar entity of device 111. The request message may include the information of inactive SL registrar entities. At step 165, based on the request of step 164, device 111 may update the registration management information. The status of gateway 113 may be changed to non-functional and the status of gateway 114 is changed to active. Device 111 may send a response back to gateway 114 and may begin to uses the SL provided by gateway 114. At step 166, based on the request of step 162, request from the M2M/IoT Server, gateway 114 may send a request to device 112 to notify it that its original active gateway 113 is non-functional, gateway 114 becomes the active registrar entity of device 112. The request message may include the information of inactive SL registrar entities. At step 167, based on the request of step 166, device 112 may update the registration management information. The status of gateway 113 may be changed to non-functional and the status of gateway 114 may be changed to active. Device 112 may send a response back to gateway 114 and may begin to use the SL provided by gateway 114.

Figure 18:
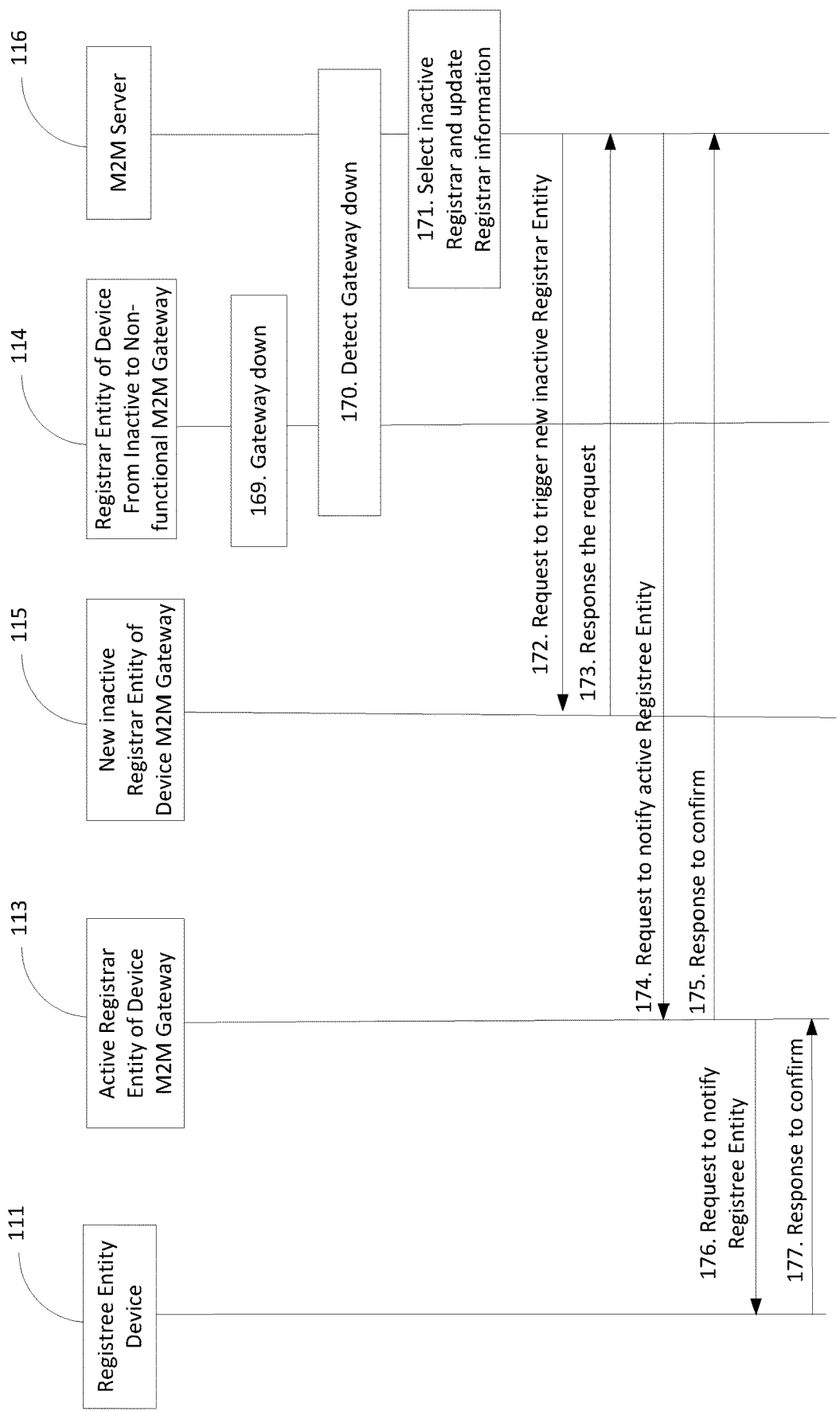
FIG. 18 illustrates an exemplary M2M/IoT Server Centric Procedure to Trigger a SL Registrar Entity to Become an inactive SL Registrar Entity.

Disclosed below is an exemplary M2M/IoT server centric procedure when an inactive registrar entity is non-functional. In order to describe the disclosed procedure, SL entities in FIG. 12 are used as an example. In FIG. 18, gateway 113 may be initially functioning as the active SL for device 111 and gateway 114 may be initially functioning as the inactive SL for device 111. After gateway 114 is non-functional (e.g., step 169), M2M/IoT server 116 may detect gateway 114 is non-functional (e.g., step 170) if it does not receive a response message or a scheduled service message from gateway 114. M2M/IoT server 116 may be notified by other entities that gateway 114 is non-functional, for example step 146 in FIG. 15. M2M/IoT server 116 may also learn, via administrative means, that gateway 114 may become non-functional or should be considered non-functional. When gateway 114 is non-functional, M2M/IoT sever 116 may send a request to gateway 114 to verify that gateway 114 is non-functional. M2M/IoT server 116 follows the disclosed procedure with regard to FIG. 18.

At step 171, M2M/IoT server 116 may find each SL entity, e.g. device 111, which is using gateway 114 as the inactive registrar entity based on the registration management information in Table 5, for example. M2M/IoT server 116 may first select new registrar entity(s) capable of providing the reliable and continued service based on the requirement of the registree entity (e.g., device 111). M2M/IoT server 116 then updates the registration management information associated with device 111 as shown in Table 7, for example. The status of gateway 114 is changed to non-functional and a new entry associated with gateway 115 is added. M2M/IoT server 116 then notifies gateway 115 to become the inactive registrar entity for device 111. M2M/IoT server 116 may repeat the same process for other devices that may be using gateway 114 as the inactive registrar entity. M2M/IoT server 116 may send a request to gateway 113 to inform that gateway 114 is not an inactive registrar and asking gateway 113 to synchronize with gateway 115.

TABLE 7

Registration Management Information Stored in a M2M/IoT Server, Gateway or Device after the Procedure

| Registree Entity ID | Registrar Entity ID | Status | Reliability |
| --- | --- | --- | --- |
| device 111 | gateway 113 | Active | 0.99 |
| device 111 | gateway 114 | Non-functional | 0.9999 |
| device 111 | gateway 115 | Inactive | 0.9999 |

With continued reference to FIG. 18, at step 172, M2M/IoT server 116 may send a request to notify gateway 115 to become the inactive registrar entity for device 111. If gateway 115 is also selected as the active registrar entity for other devices, the request may also notify gateway 115 to become the active registrar entity for these devices. The request may also include SL context information for device 111 and other devices. At step 173, gateway 115 may send a response back to M2M/IoT server 116. Gateway 115 may request to synchronize its SL with SL context associated with device 111 as described herein. At step 174, M2M/IoT server 116 may send a request to gateway 113 to notify that gateway 114 is non-functional, gateway 115 may then become an inactive registrar entity of device 111.

At step 175, based on the request of step 174, gateway 113 may update the registration management information. The status of gateway 114 may be changed to non-functional and the entry associated with gateway 115 may be added as shown in Table 7. Gateway 113 may request to synchronize with gateway 115 about SL context associated with device 111 as described herein. Gateway 113 may send a response back to the M2M/IoT server 116. At step 176, after receiving the request of step 174 from the M2M/IoT server 116, gateway 113 may send a request to device 111 to notify it that its inactive gateway 114 is non-functional, gateway 115 becomes the inactive registrar entity of device 111. The request message may include the information of other inactive SL registrar entities. At step 177, based on the request of step 176, device 111 may update the registration management information. The status of gateway 114 may be changed to non-functional and gateway 115 may be added as an inactive registrar. Device 111 may send a response back to gateway 113 and use the inactive SL provided by gateway 115.

Figure 19:
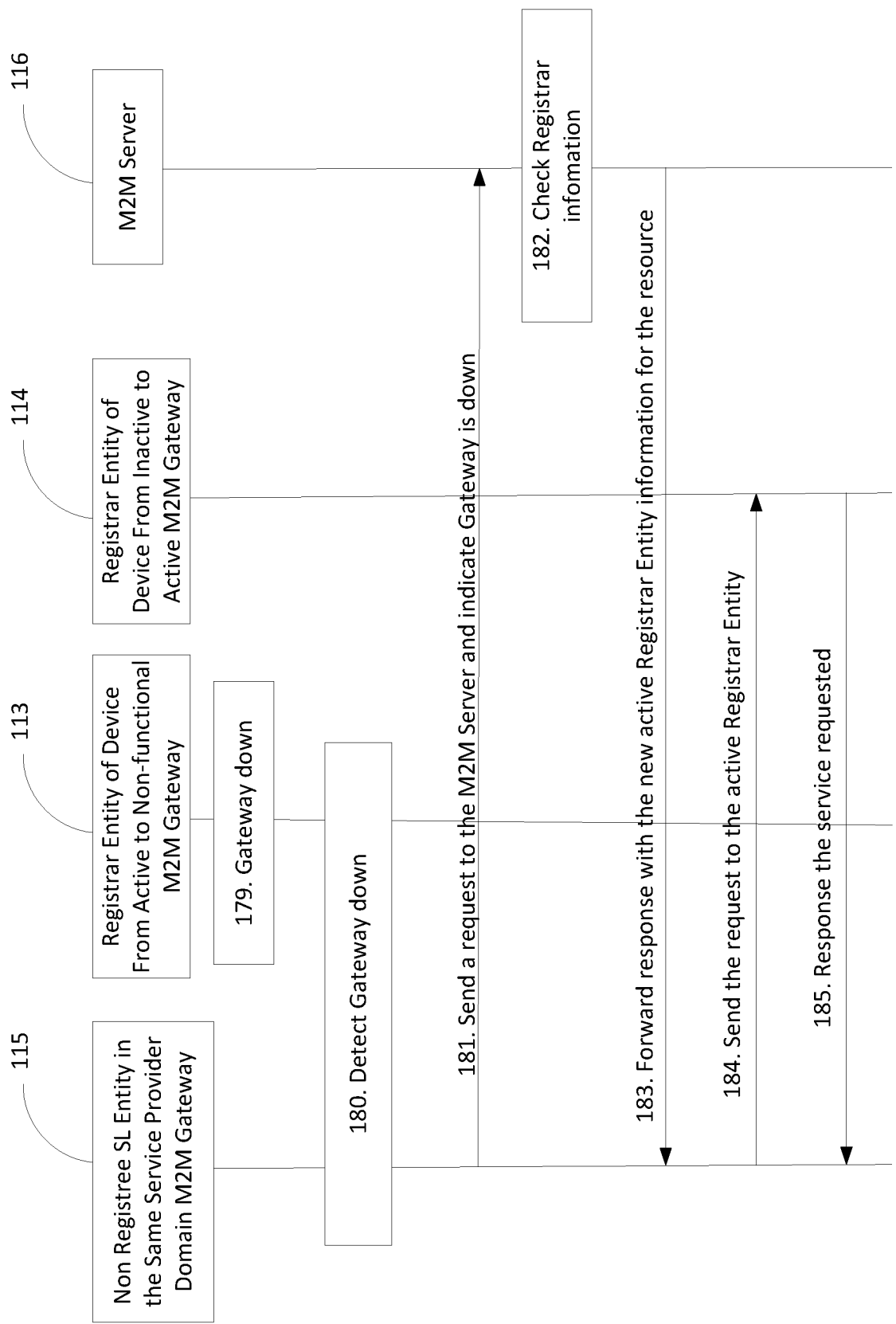
FIG. 19 illustrates an exemplary Procedure for a SL Entity when Detecting another SL Entity in the Same Service Provider Domain is Non-functional.

Disclosed below is a procedure for a SL entity when it detects another SL entity is non-functional in the same service provider domain. In order to describe the procedure, SL entities in FIG. 12 are used as an example. In FIG. 19, gateway 113 may initially function as the active SL for device 111 and gateway 114 may initially function as the inactive SL for device 111. After gateway 113 is non-functional (e.g., step 179), gateway 115 may detect this event (e.g., step 180) when it fails to receive a response message or a scheduled service message from gateway 113. Then gateway 115 may follow the procedure as shown in FIG. 19. At step 181, gateway 115 may send a request to M2M/IoT server 116. In the request, gateway 115 may indicate it has attempted to communicate with gateway 113 to retrieve SL context associated with device 111, e.g. retrieve a resource associate with device 111 on gateway 113, but gateway 113 is non-functional. Of course, detection of the failure event may be based on other means, for example an administrator may have notified gateway 115 that gateway 113 is non-functional or will become non-functional at a predetermined period.

With continued reference to FIG. 18, at step 182, based on the request of step 181, M2M/IoT server 116 may check the registration information associated with device 111 in the registration management table, for example as shown in Table 5. If the status of gateway 113 is non-functional or inactive, this may indicate that another entity has reported this information to M2M/IoT Server. If the status of gateway 113 is active, this indicates that no entity has reported this information to the M2M/IoT server 116. In this case, M2M/IoT server 116 may use the procedure disclosed herein when it is notified that gateway 113 is non-functional. At the end of the procedure, gateway 114 becomes the active registrar entity for device 111. At step 183, M2M/IoT server 116 may send a response to gateway 115, which may include the information about new active registrar entity, e.g. SL ID of gateway 114. At step 184, based on the response of step 184, gateway 115 may send a service request associated with device 111 directly to the new active registrar entity, e.g., gateway 114. At step 185, gateway 114 may respond to gateway 115.

Figure 20:
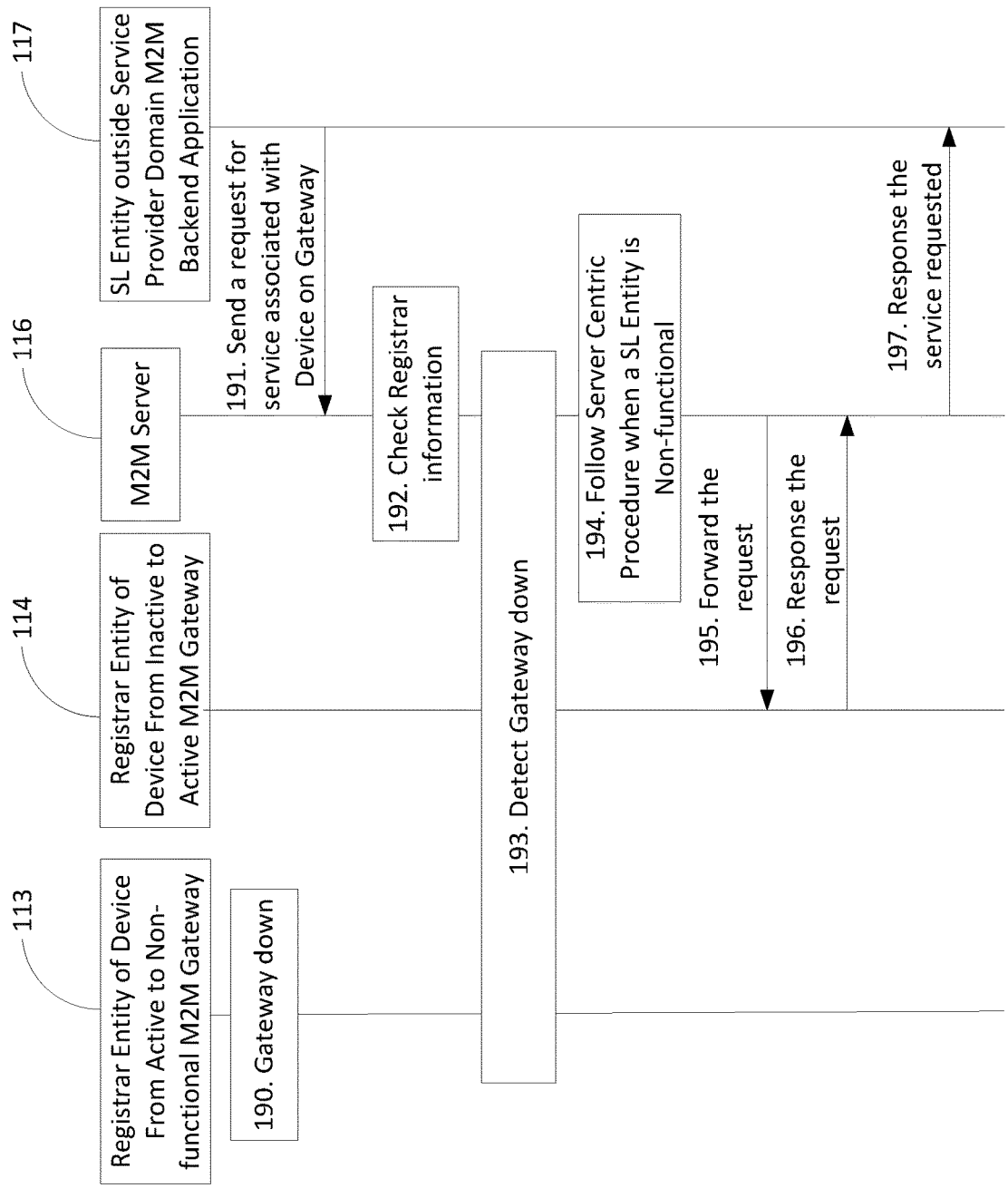
FIG. 20 illustrates an exemplary Procedure for a SL Entity Detecting another SL Entity in a Different Service Provider Domain is Non-functional.

Disclosed below is a procedure for a SL entity when another SL entity is non-functional in a different service provider domain. In order to describe the disclosed procedure, SL entities in FIG. 12 are used in an example. In FIG. 20, gateway 113 is functioning as the active SL for device 111 and gateway 114 is functioning as the inactive SL for device 111. After gateway 113 is non-functional (e.g., step 190), a SL entity in a different service provide domain, e.g. M2M/IoT Backend Application 117, requests for service associated with device 111 on gateway 113. M2M/IoT Server 116 may follow the procedure shown in FIG. 20 to provide the reliable and continued service. At step 191, M2M/IoT Backend Application 117 may send a request to M2M/IoT server 116 for service associated with device 111 on gateway 113.

At step 192, based on the request of step 191, M2M/IoT server 116 may check the registration management information associated with device 111. If the status of gateway 113 is non-functional or inactive, this may indicate that another entity has reported this information to M2M/IoT server 116. In this case, M2M/IoT server 116 may forward the request to gateway 114, which is the active registrar entity of device 111 as shown in step 195. If the status of gateway 113 is active, this may indicate that no entity has reported gateway 113 is non-functional to the M2M/IoT server 116. In this case, M2M/IoT server 116 may forward the request to gateway 113 and then detects gateway 113 is non-functional as in step 193. At step 193, M2M/IoT server 116 may detect gateway 113 is non-functional. At step 194, based on detecting gateway 113 is non-functional, M2M/IoT server 116 may follow the procedures herein with regard to detecting that gateway 113 is non-functional. At the end of the procedure, gateway 114 may become the active registrar entity for device 111. At step 195, M2M/IoT server 116 may forward the request to gateway 114. At step 196, gateway 114 may send response back to M2M/IoT server 116, which may include requested service by Backend Application 117. At step 197, M2M/IoT server 116 may forward response received from gateway 114 to Backend Application 117.

Figure 21:
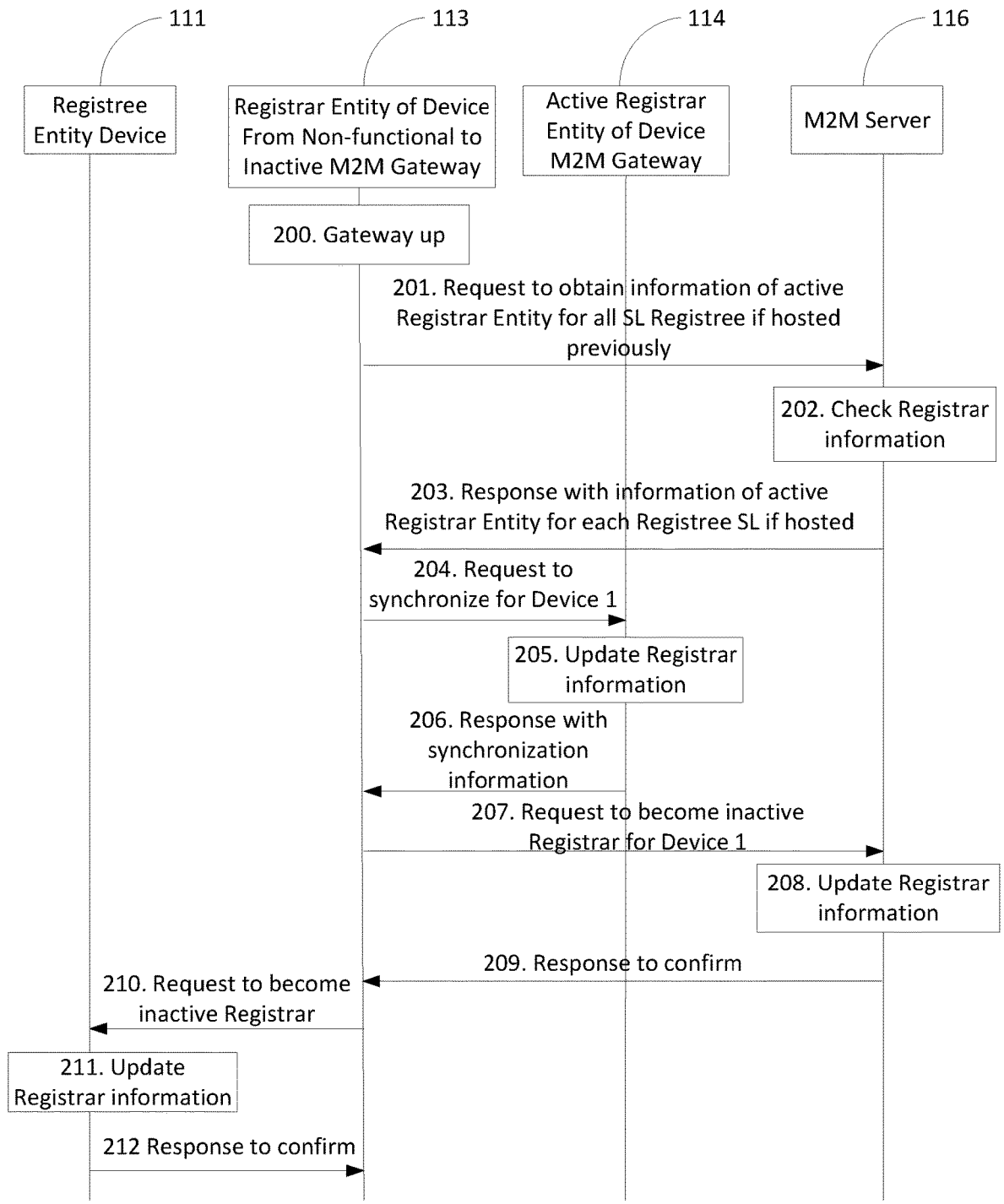
FIG. 21 illustrates an exemplary Procedure for a SL Entity Recovery.

Disclosed below is a procedure to enable a SL entity to provide reliable service to other SL entities when the SL entity is recovered from a failure. To achieve this, the SL entity may have to synchronize its service layer with other active SL entity when it is functional. In order to describe the disclosed procedure, SL entities in FIG. 12 are used in an example. In FIG. 21, gateway 114 may provide active SL for device 111 and gateway 113 previously provided active SL for device 111 before its failure. Gateway 113 may follow the disclosed procedure to synchronize its service layer and become an inactive registrar for device 111, as shown in FIG. 21. At step 201, after gateway 113 is up (e.g., step 200), gateway 113 may send a request to M2M/IoT server 116 to obtain information of active registrar entity(s) for all SL registree(s) it functioned as an active SL for before it became unavailable. Alternatively, this request may be the registration request when gateway 113 re-registers to M2M/IoT server 116 after it recovered from a failure.

At step 202, M2M/IoT server 116 may check registration management table, as in Table 5, to find SL entities, e.g. device 111, which have registered to gateway 113. At step 203, M2M/IoT server 116 may respond with the information of SL entities that have registered to gateway 113 along with their active registrar entities. Alternatively, the information may be embedded in the registration response when gateway 113 re-registers to sever 116 after it recovered from a failure. At step 204, for each SL entity, e.g. device 111, which has registered to gateway 113, gateway 113 may send a request to the active registrar entity of device 111 in order to synchronize its SL context associated with device 111. At step 205, gateway 114 may find the entry that is associated with device 111 and gateway 113, and change its status from non-functional to inactive, such as shown in Table 7.

TABLE 8

Registration Management Information Stored in gateway after Receiving Synchronization Request from gateway

| Registree Entity ID | Registrar Entity ID | Status |
| --- | --- | --- |
| device 111 | gateway 113 | Inactive |

With continued reference to FIG. 21, at step 206, gateway 114 may send a response back to gateway 113 that may include SL context information associated with SL device 111. It is contemplated herein that instead of sending messages at step 204 and step 206 between gateways, they may be exchanged via M2M server 116. At step 207, based on SL of device 111 being synchronized, gateway 113 may send a request to M2M/IoT server 116 indicating that it may be an inactive registrar entity of device 111 to provide reliable service. At step 208, M2M/IoT server 116 may find the entry that associates with device 111 and gateway 113, and may change its status from non-functional to inactive, such as shown in Table 8.

TABLE 9

Registration Management Information Stored in M2M/IoT server after Receiving Request from gateway

| Registree Entity ID | Registrar Entity ID | Status |
| --- | --- | --- |
| device 111 | gateway 113 | Inactive |
| device 111 | gateway 114 | Active |

At step 209, M2M/IoT server 116 may send a response to confirm gateway 113 is an inactive registrar entity for device 111. At step 210, based on the SL of device 111 being synchronized, gateway 113 may send a request to device 111 indicating that it may be an inactive registrar entity of device 111 to provide a reliable service. At step 211, device 111 may find the registration entry that associates gateway 113, and may change its status from non-functional to inactive as shown in Table 9. At step 212, device 111 may send a response to confirm gateway 113 is an inactive registrar entity for device 111.

Figure 22:
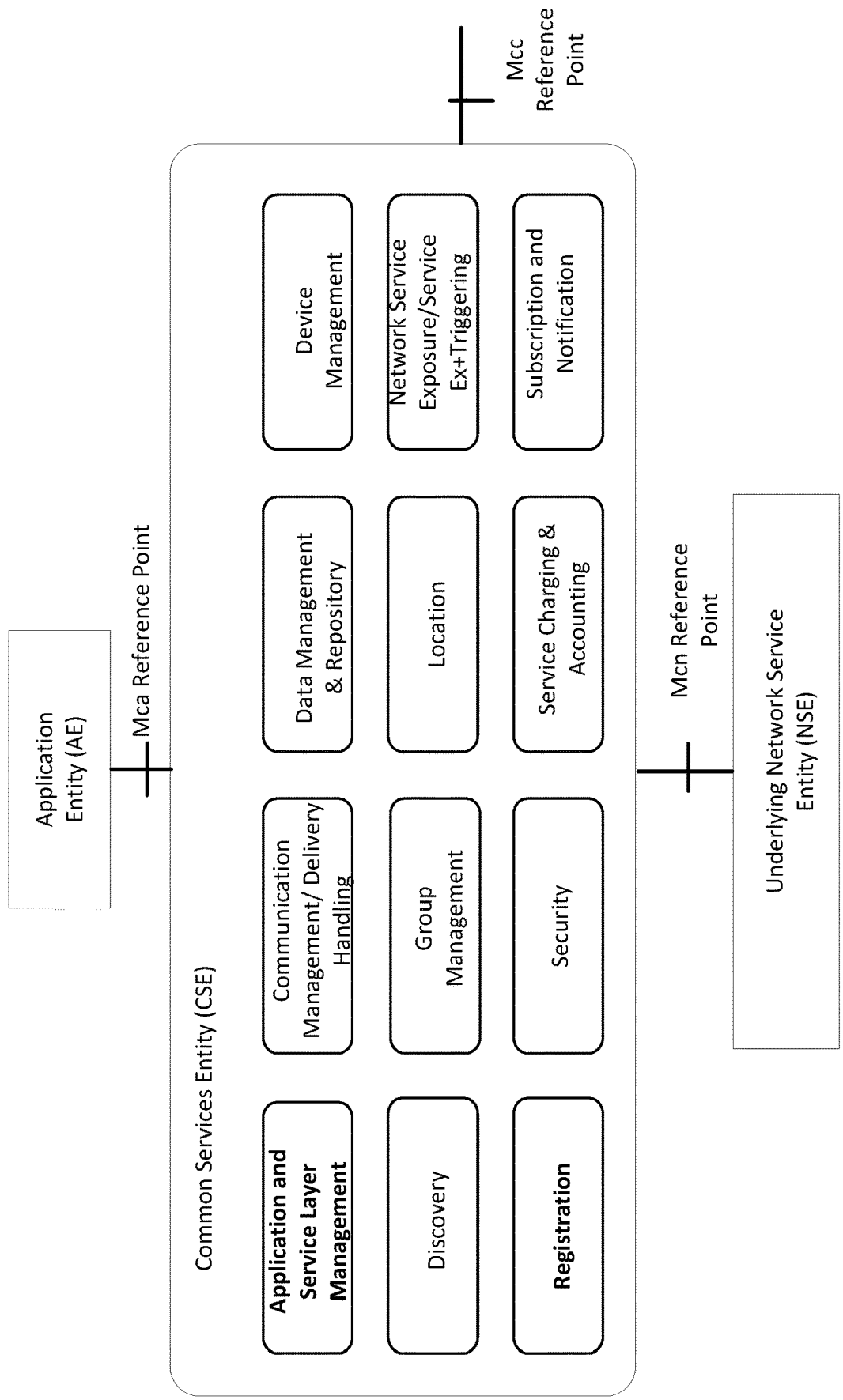
FIG. 22 illustrates an exemplary oneM2M CSF.

Disclosed below are examples that illustrate how the methods herein may be implemented in oneM2M. oneM2M defines the capabilities supported by the oneM2M Service Layer. The oneM2M Service Layer is instantiated as a Capability Services entity (CSE) which comprises a set of Capability Service Functions (CSF). As one example, the disclosed methods may be part of an enhanced registration CSF or part of an application or service Layer Management CSF as shown in FIG. 22. CSEs may communicate via the Mcc and Mcc' reference point to manage registration. Application entity (AE) may communicate via the Mca reference point to manage registration.

Figure 23:
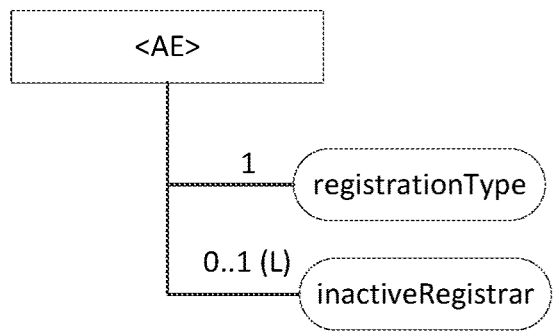
FIG. 23 illustrates an exemplary Attributes under <AE>.

Attributes are disclosed to add under <AE> as shown in FIG. 23. Table 10 describes attributes that may be of the <AE> resource.

TABLE 10

New Attributes of <AE>

| Attributes of <AE> | Description | Attributes of <AEAnnc> |
| --- | --- | --- |
| registration Type | Indicates whether the registration is active or inactive. | OA |
| inactiveRegistrar | This attribute may include a list of identifiers of inactive registrar CSEs of the registree AE. | OA |

Figure 24:
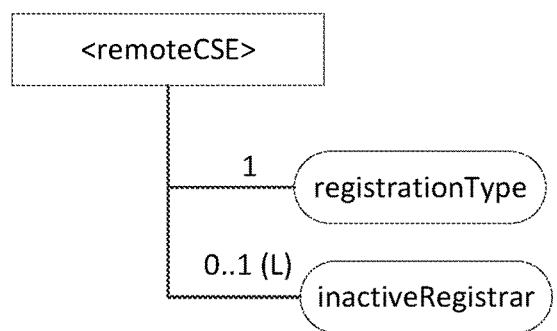
FIG. 24 illustrates an exemplary Attributes under <remoteCSE>.

Attributes are disclosed that may be added under <remoteCSE> as shown in FIG. 24. Table 11 describes the new attributes of the <remoteCSE> resource.

TABLE 11

New Attributes of <remoteCSE>

| Attributes of <remoteCSE> | Description | Attributes of <AEAnnc> |
| --- | --- | --- |
| registration Type | Indicates whether the registration is active or inactive. | OA |
| inactiveRegistrar | This attribute may include a list of identifiers of inactive registrar CSEs of the registree CSE. | OA |

The <AERegistration> resource may be under <CSE-Base> to store registration information associated with an AE. Table 12 describes the possible attributes of the <AERegistration> resource shown in FIG. 25. The <AERegistration> resource may have the <subscription> child resource as defined in oneM2M.

TABLE 12

Attribute of <AERegistration>

| Attributes of <AERegistration> | Description |
| --- | --- |
| registree | This attribute may include the identifier of the Registree AE |
| activeRegistrar | This attribute may include the identifier of the active registrar CSEs of the registree AE. |
| inactiveRegistrar | This attribute may include a list of identifiers of inactive Registrar CSEs of the Registree AE. |
| nonFunctionalRegistrar | This attribute may include a list of identifiers of non-functional registrar CSEs of the registree AE. |

Figure 26:
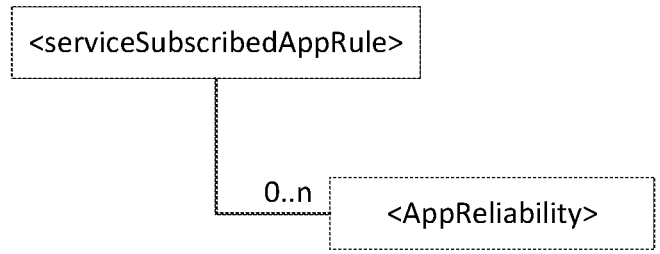
FIG. 26 illustrates an exemplary <AppReliability> Resource.
Figure 27:
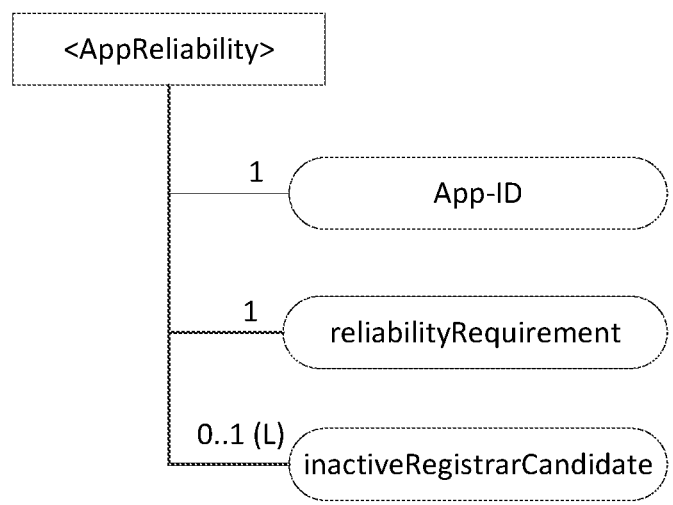
FIG. 27 illustrates an exemplary Attributes of <AppReliability> Resource.

The <AppReliability> resource may be under <serviceSubscribedAppRule> to store reliability requirement information associated with an application as shown the FIG. 26. Table 13 describes the attributes that may be under the <AppReliability> resource shown in FIG. 27.

TABLE 13

Attribute of <AppReliability>

| Attributes of <AppReliability> | Description |
| --- | --- |
| App-ID | This attribute may include the identifier of the Application |

TABLE 13-continued

Attribute of <AppReliability>

| Attributes of <AppReliability> | Description |
|---|---|
| reliabilityRequirment | This attribute may include the reliability requirement of the application. |
| inactiveRegistrarCandidate | This attribute contains a list of identifiers of registrar CSEs, which can provide inactive service. |

The <subscriptionAnnc> resource may be under <subscription> to announce the resource to other CSEs as shown in Table 14. Table 14 is an example, in which MA is Mandatory Announced; NA is Not Announced; and OA is Optional Announced. It is contemplated that MA, NA, and OA, disclosed herein (e.g., in other tables) are examples as well.

TABLE 14

Attributes of <subscriptionAnnc> resource

| Attributes of <subscription> | <subscriptionAnnc> Attributes |
|---|---|
| resourceType | NA |
| resourceID | MA |
| resourceName | MA |
| parentID | NA |
| expirationTime | MA |
| creationTime | OA |
| lastModifiedTime | OA |
| labels | MA |
| accessControlPolicyIDs | MA |
| eventNotificationCriteria | OA |
| expirationCounter | OA |
| notificationURI | OA |
| groupID | OA |
| notificationForwardingURI | OA |
| batchNotify | OA |
| rateLimit | OA |
| preSubscriptionNotify | OA |
| pendingNotification | OA |
| notificationStoragePriority | OA |
| latestNotify | OA |
| notificationContentType | OA |
| notificationEventCat | OA |
| creator | OA |
| subscriberURI | OA |
| announcTo | NA |
| announcedAttribute | NA |

Figure 28:
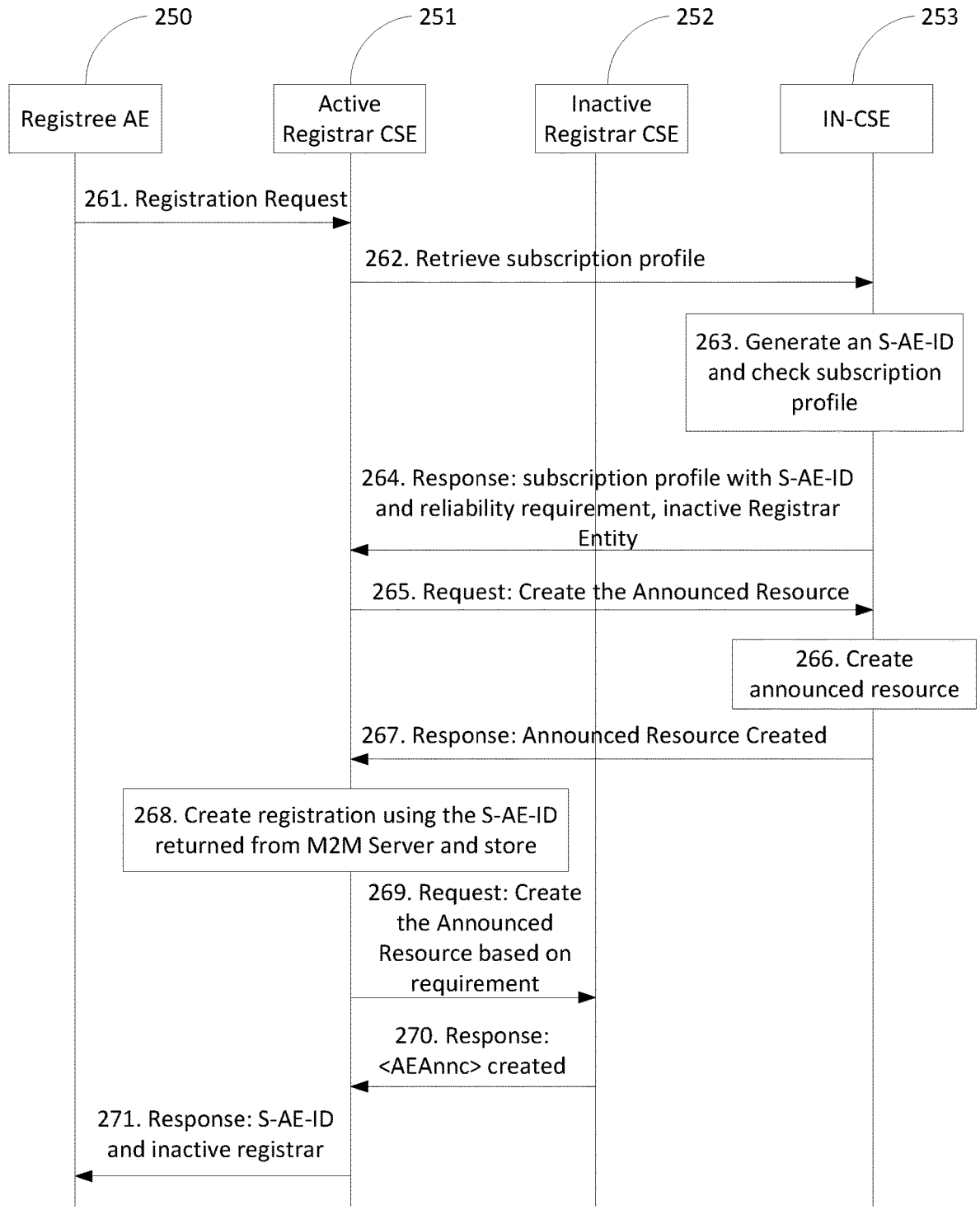
FIG. 28 illustrates an exemplary Enhance Registration Procedure to Create an Inactive Registration to Provide Reliable and Continued Service.

An enhanced registration procedure to enable reliable and continued service is shown in FIG. 28. At step 261, registree AE 251 (e.g., device 111) may send a registration request message to active registrar CSE 251. The registration request message may contain the requirement of the service reliability. In one example, registree AE 250 may indicate whether it requires a reliable service from the Service Layer. Registree AE 250 may also indicate other service reliability preferences or requirements, for example, the minimum reliability of the service, number of inactive service layers it requires or the list of the inactive registrar entity to provide reliable service as listed in Table 1. At step 262, based on the registration request message of step 261, if active registrar CSE 251 does not have a subscription profile associated with registree AE, it may send a request to retrieve the subscription profile from IN-CSE 253, which may include the service reliability requirement of registree AE 250, such as shown in Table 1, such that IN-CSE 253 may provide a list of inactive registrar CSEs to provide the reliable and continued service.

Figure 25:
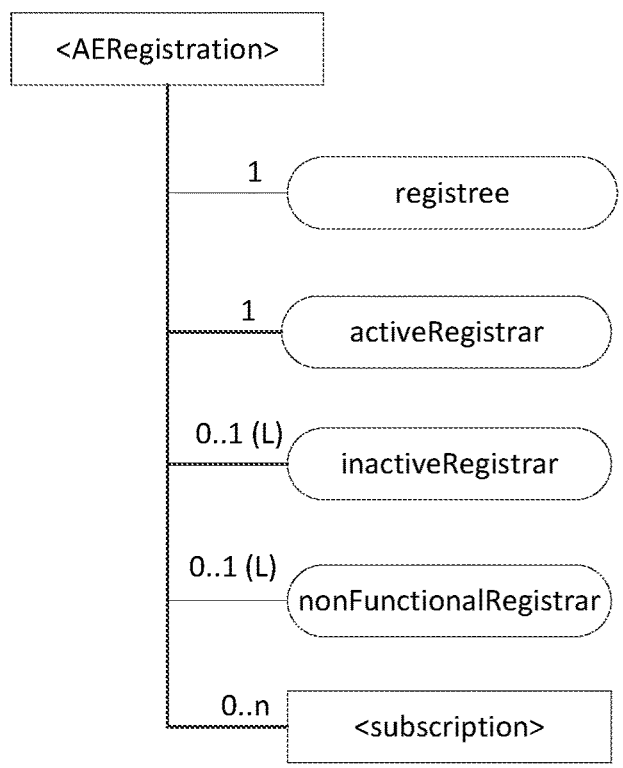
FIG. 25 illustrates an exemplary <AERegistration> Resource.

With continued reference to FIG. 28, at step 263, IN-CSE 253 may first generate a unique AE-ID, e.g., S-AE-ID, within the service provider domain for registree AE 250. IN-CSE 253 may then store the registration information under <AERegistration> as shown in FIG. 25. If the request contains the preference of service reliability, IN-CSE 253 may use the information that is listed in Table 1, for example, to determine and provide a list of inactive registrar entities to provide the reliable and continued service. If the request of step 261 does not include a service reliability requirement, IN-CSE 253 may check <AppReliability> resource under <serviceSubscribedAppRule> resource as shown in FIG. 26. If rules are configured that reliability is needed for the particular device or type of device (e.g., with registree AE 250), IN-CSE 253 may determine a list of inactive registrar CSE capable of providing the reliable and continued service based on the pre-defined policy. At step 264, IN-CSE 253 may send a response to the active registrar CSE 251. The response message may include the S-AE-ID for the registree AE. The response may include a list of inactive registrar CSEs 252 that meet the reliability requirement of the registree AE 250, and may indicate registrar CSEs to create inactive registrations on behalf of registree AE 250.

At step 265, registrar CSE 251 may send a request to create an <AEAnnc> resource at the IN-CSE 253. In the <AEAnnc> resource, the registrationType attribute may be set to active. The registrar CSE may synchronize SL context, e.g. attributes and subresource, of the <AE> resource with the <AEAnnc> resource on the IN-CSE 253 by adding these context in the announcedAttributes. At step 266, IN-CSE 253 may create the <AEAnnc> resource for registree AE 250. At step 267, IN-CSE 253 may send a response to the active registrar entity to confirm the creation of <AEAnnc>. At step 268, based on the response of step 267, active registrar CSE 251 may create AE resource for registree AE 250. Based on the inactive registrar CSE list generated by itself (registrar CSE 251), provided by registree AE 250 or IN-CSE 253, active registrar CSE 251 may start to create inactive SL registrations on behalf of registree AE 250 at the inactive registrar CSEs. In one implementation, registrar CSE 251 may add the CSE-ID of inactive registrar CSE 252 in the announceTo attribute for the resource to synchronize. The SL context to be synchronized with inactive registrar CSE 252 may be added in the announcedAttribute, such that, <AE> resource on active registrar CSE 251 and <AEAnnc> resource on inactive registrar CSE 252 may be synchronized for the selected SL context.

At step 269, registrar CSE 251 may send a request to create an <AEAnnc> resource at inactive registrar CSE 252. At step 270, based on the request of step 267, inactive registrar CSE 252 creates <AEAnnc> resource for registree AE 250 as an inactive SL registration. Inactive registrar CSE 252 may send a response to active registrar 251. At step 271, registrar CSE 251 may send a response to registree entity 250 that the active and inactive SLs have been assigned. The response message may contain the CSE-ID and network address of inactive SL registrar CSEs.

Figure 29:
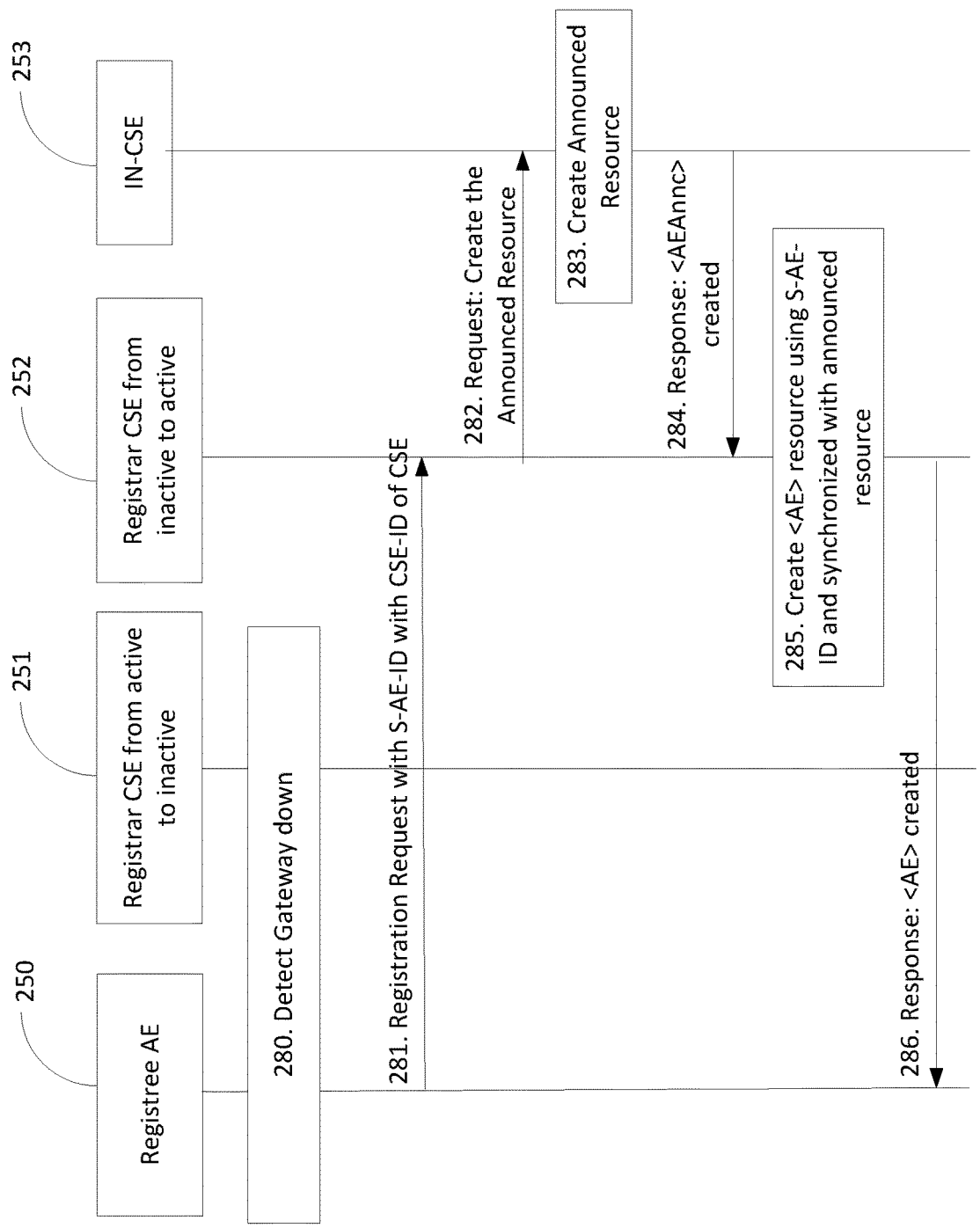
FIG. 29 illustrates an exemplary Enhance Registration Procedure when a Registree Entity Detecting its SL Registrar Entity is Non-functional.

FIG. 29 illustrates an exemplary registration procedure when a registree AE detects its registrar CSE is non-functional. At step 280, registrar CSE 251 is detected to be down. At step 281, registree AE 250 selects one of its inactive registrar CSEs (e.g., registrar CSE 252) to provide it with service. The selection may be based on information that was provided to registree AE 250 during the initial registration with now non-functional registrar CSE 251. For example, registree AE 250 may randomly select an inactive registrar CSE among its list of inactive registrar CESs or registree AE 250 may have been provided with a ranking of the inactive registrar CSEs. Registree AE 250 then may send a registration request to the selected inactive registrar CSE 252, requesting the inactive registrar CSE 252 become active and indicating that registrar CSE 251 is non-functional. The request may include S-AE-ID of registree AE 250 and CSE-ID of CSE 251. At step 282, based on the request of step 281, CSE 252 may send a request to create an announced resource for registree AE 250 at IN-CSE 253 and CSE 252 may notify IN-CSE 253 that it has become the active registrar CSE for registree AE 250 and CSE 251 is non-functional. If CSE 252 does not have a <AEAnnc> resource associated with registree AE250 that is synchronized with CSE 251 for inactive registration, CSE 252 may request to synchronize the SL context associated with registree AE 250 on IN-CSE 253.

At step 283, based on the request of step 282, IN-CSE 253 updates the <AERegistration> associated with registree AE 250. CSE 251 may be removed from active registrar CSE list and added into non-functional registrar CSE list. CSE 252 may be removed from inactive registrar CSE and becomes the active registrar CSE. At step 284, IN-CSE 253 may send a response to CSE 252 including the CSE-ID of inactive registrar entities associated with device 111. The response may include the SL synchronization information if requested by CSE 252. At step 285, CSE 252 may create <AE> resource associated with registree AE 250. The <AE> resource may be synchronized with <AEAnnc> resource on CSE 252 or IN-CSE 253. CSE 252 may then start providing continued active service for registree AE 250. CSE 252 may add the CSE-ID of inactive registrar CSE (not shown in FIG. 29) in the announceTo attribute for the resource to synchronize. The SL context to be synchronized with inactive registrar CSE may be added in the announcedAttribute, such that <AE> resource on the active registrar CSE and <AEAnnc> resource on the inactive registrar CSE may be synchronized for the selected SL context. At step 286, CSE 252 may send a response to registree AE 250 that the <AE> resource is created. The response message may include the information of inactive SL registrar entities.

Difference between methods in FIG. 16-FIG. 20 may be based on which entity triggers the method. For example, FIG. 16 discloses a Registree Entity centric procedure that may trigger an inactive SL Registrar Entity to take over and become the active SL Registrar Entity when the Registree Entity itself detects its SL Registrar Entity is non-functional. In order to use this procedure, a Registree Entity may be provided with a list of inactive SL Registrar Entity during the registration process as described herein. FIG. 17 discloses a M2M Server centric procedure that may trigger an inactive SL Registrar Entity to take over and become the active SL Registrar Entity when it knows a SL Registrar Entity is non-functional in its service provider domain. FIG. 18 discloses a M2M Server centric procedure that may trigger a SL Registrar Entity to become an inactive SL Registrar Entity when it knows a SL Registrar Entity is non-functional in its service provider domain. FIG. 19 discloses a procedure for a SL Entity when detecting another SL Entity that is non-functional in the same service provider domain. FIG. 20 discloses a procedure for a SL Entity when detecting another SL Entity is non-functional in a different service provider domain.

Figure 30:
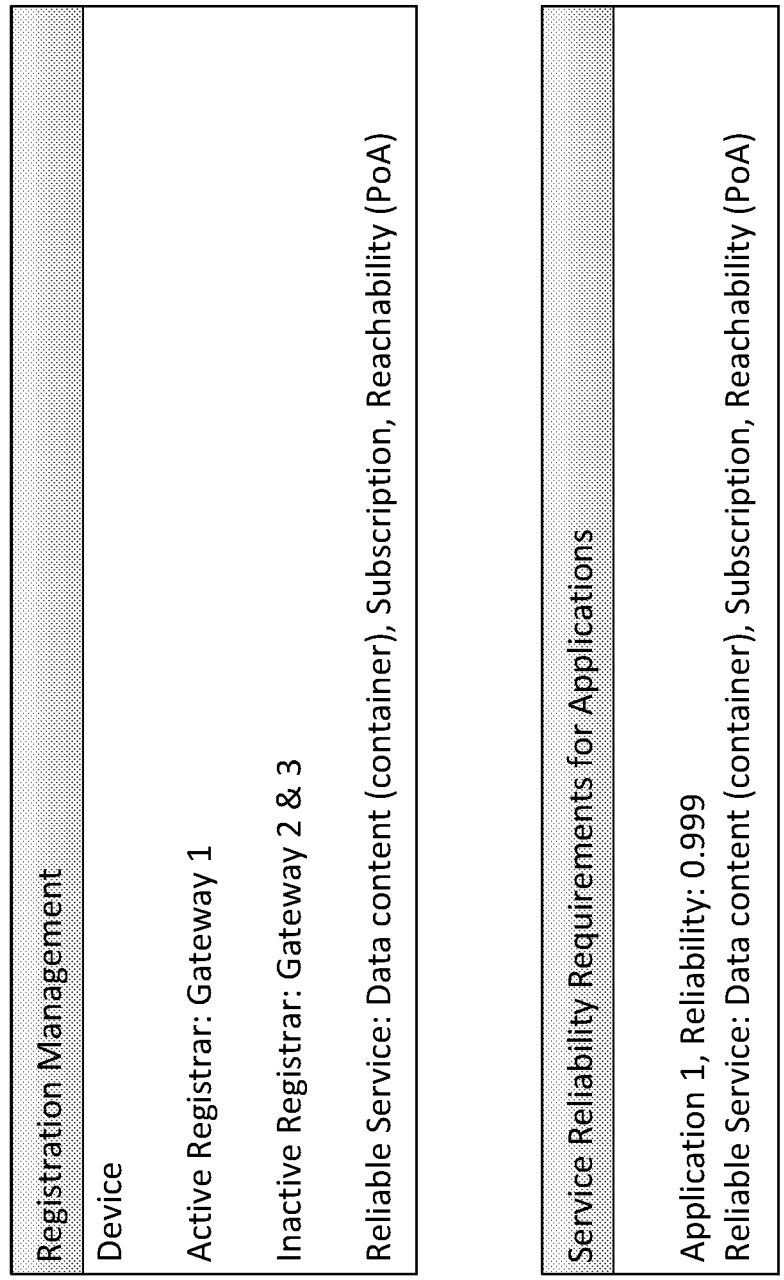
FIG. 30 illustrates an exemplary User Interface for M2M/IoT Server (i.e. an oneM2M IN-CSE)

FIG. 30 illustrates an exemplary user interface for M2M/IoT Server (e.g., an oneM2M IN-CSE). A user interface may be added to a M2M/IoT server (e.g. an oneM2M IN-CSE 253) to configure or display parameters of AEs that are registered in the service provider domain and the registration management information associated with these AEs. The service reliability requirement for applications may also be configured or displayed.

Figure 31:
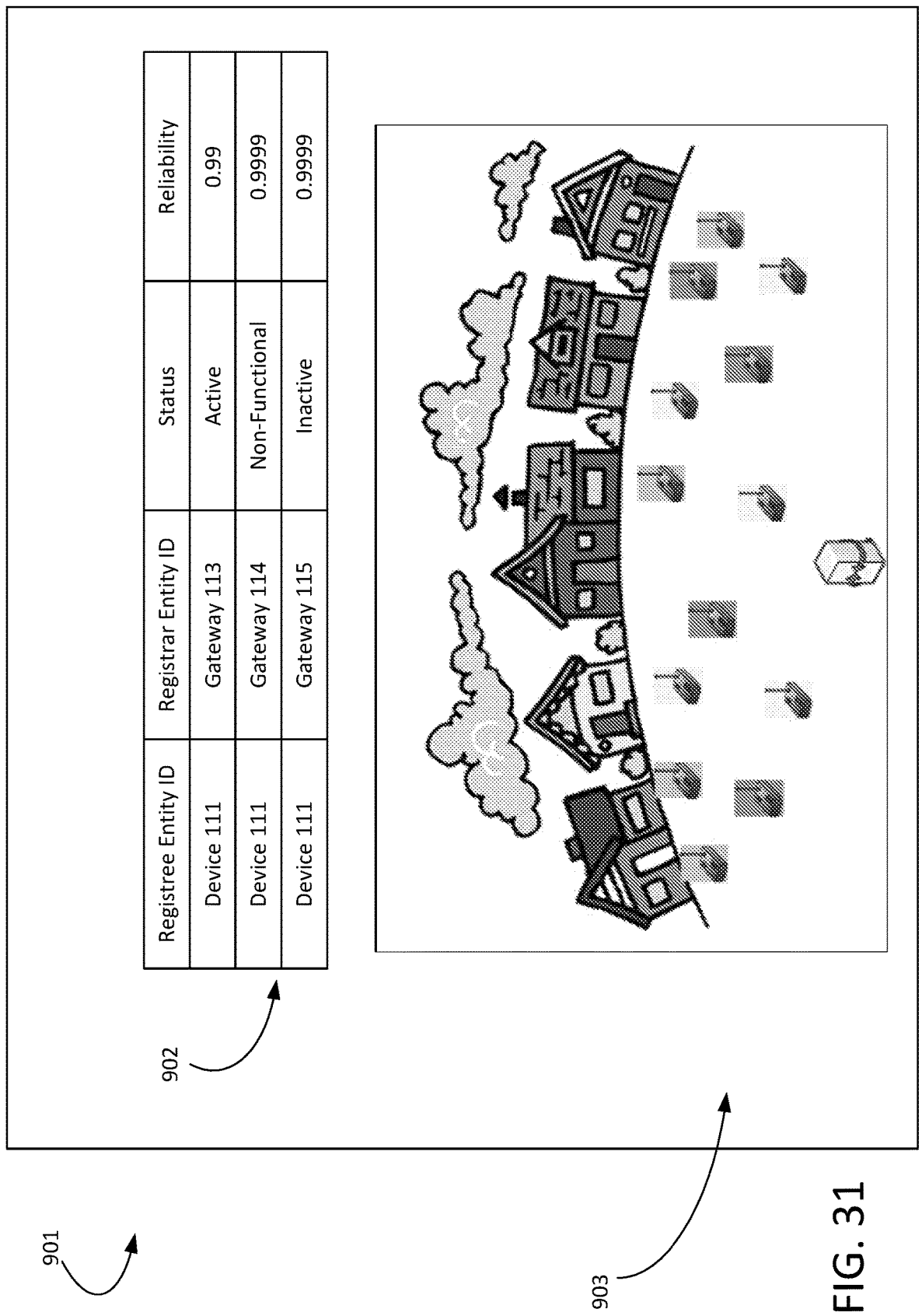
FIG. 31 illustrates an exemplary User Interface for M2M/IoT enabling reliable and continued distributed M2M/IoT services
Figure 32A:
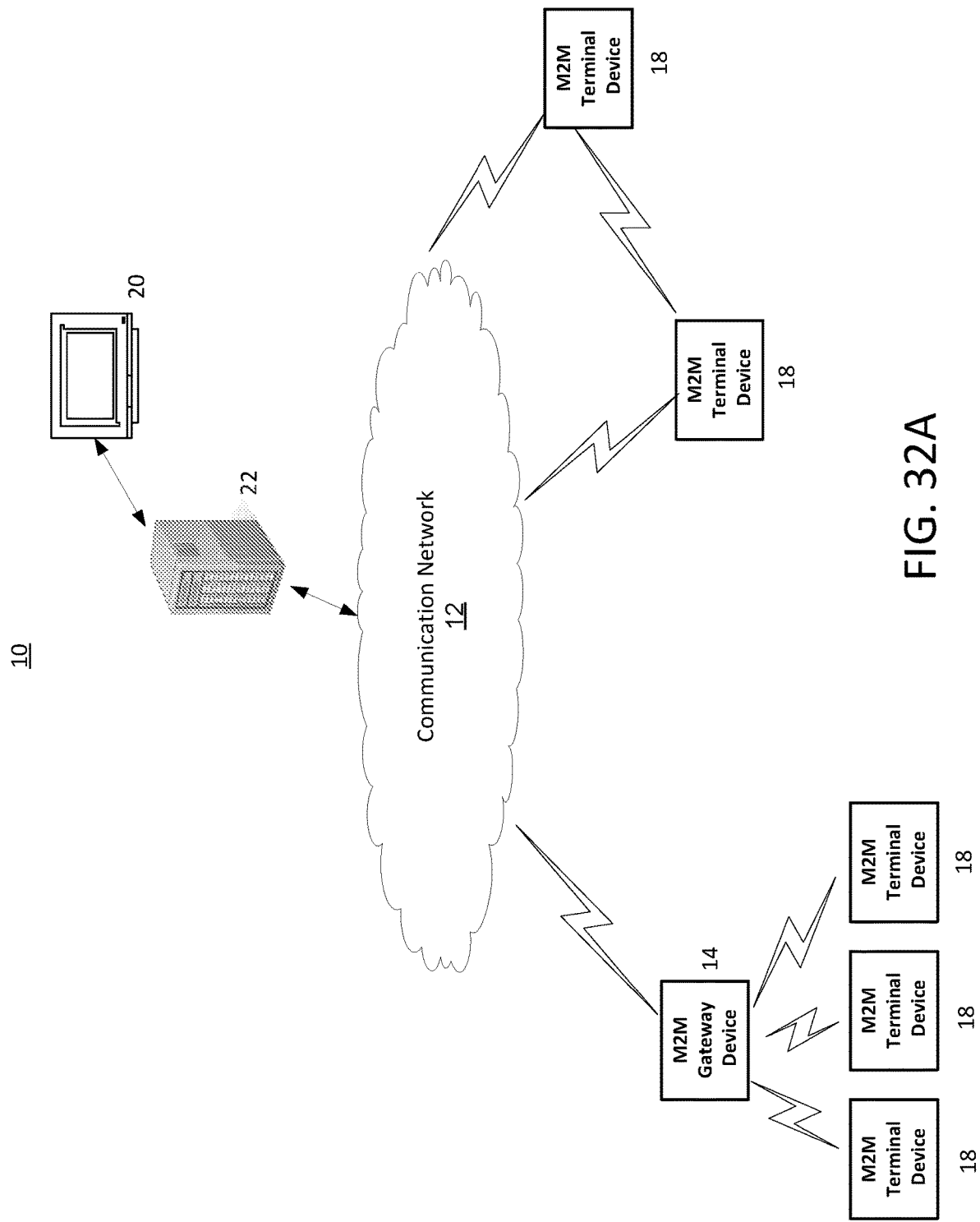
FIG. 32A illustrates an exemplary machine-to-machine (M2M) or Internet of Things (IoT) communication system in which the disclosed subject matter may be implemented.

FIG. 31 illustrates an exemplary display (e.g., graphical user interface) that may be generated based on the methods and systems discussed herein. Display interface 901 (e.g., touch screen display) may provide text in block 902 associated with enabling reliable and continued distributed M2M/IoT services, such as the parameters of Table 1 through Table 14. In another example, progress of any of the steps (e.g., sent messages or success of steps) discussed herein may be displayed in block 902. In addition, graphical output 903 may be displayed on display interface 901. Graphical output 903 may be the topology of the devices in a enabling reliable and continued distributed M2M/IoT services, a graphical output of the progress of any method or systems discussed herein, or the like FIG. 32A is a diagram of an example machine-to machine (M2M), Internet of Things (IoT), or Web of Things (WoT) communication system 10 in which one or more disclosed concepts associated with enabling reliable and continued distributed M2M/IoT services may be implemented (e.g., FIG. 11-FIG. 30 and accompanying discussion). Generally, M2M technologies provide building blocks for the IoT/WoT, and any M2M device, M2M gateway or M2M service platform may be a component of the IoT/WoT as well as an IoT/WoT service layer, etc.

As shown in FIG. 32A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 32A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Figure 32B:
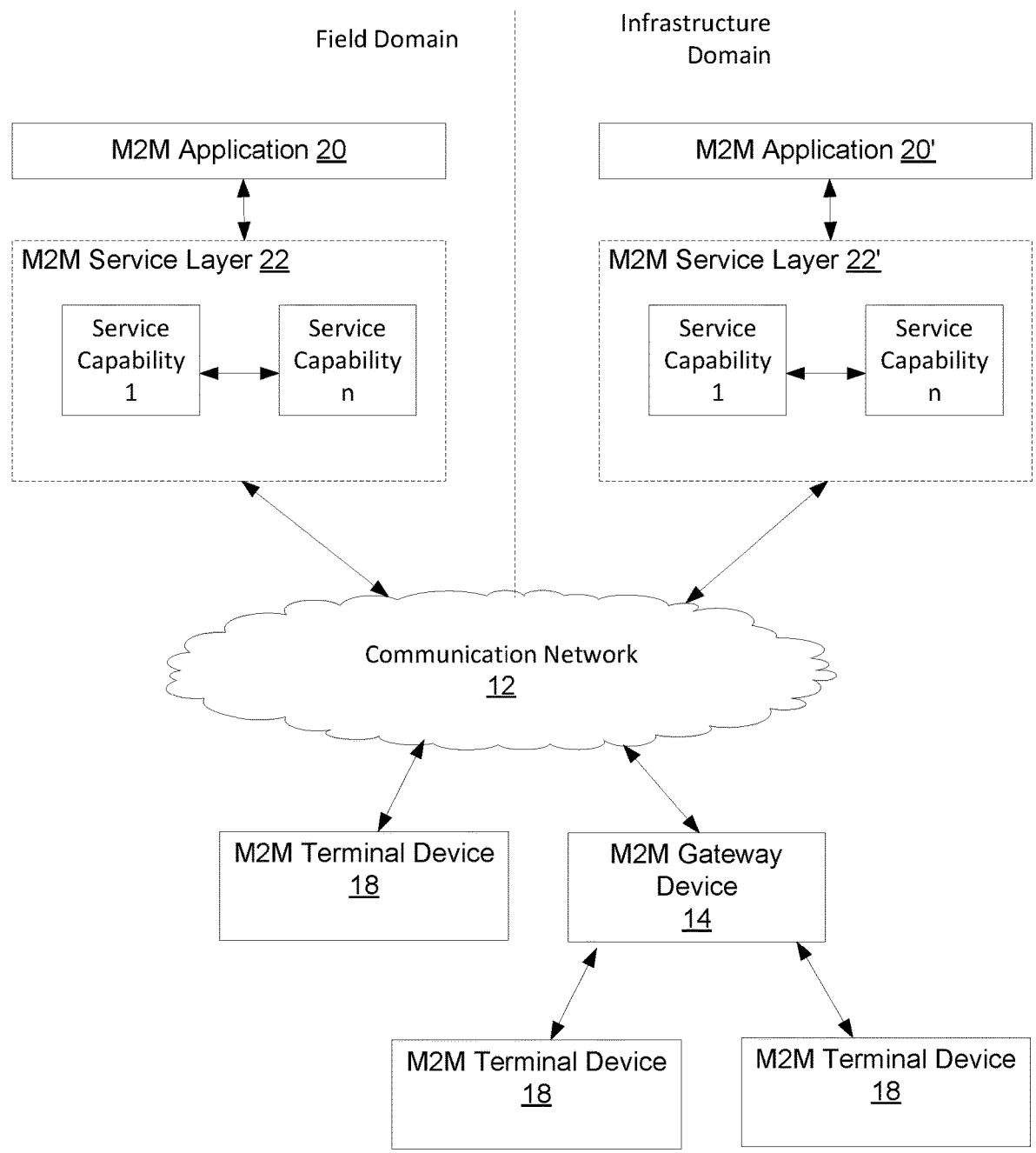
FIG. 32B illustrates an exemplary architecture that may be used within the M2M/IoT communications system illustrated in FIG. 32A.

Referring to FIG. 32B, the illustrated M2M service layer 22 (e.g., CSE 251 as described herein) in the field domain provides services for the M2M application 20 (e.g., device 111 or registree AE 250), M2M gateway devices 14, and M2M terminal devices 18, and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/computer/storage farms, etc.) or the like.

Referring also to FIG. 32B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate for enabling reliable and continued distributed M2M/IoT services, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The enabling reliable and continued distributed M2M/IoT services of the present application may be implemented as part of a service layer. The service layer is a middleware layer that supports value-added service capabilities through a set of application programming interfaces (APIs) and underlying networking interfaces. An M2M entity (e.g., an M2M functional entity such as a device, gateway, or service/platform that is implemented on hardware) may provide an application or service. Both ETSI M2M and oneM2M use a service layer that may include the enabling reliable and continued distributed M2M/IoT services of the present application. The oneM2M service layer supports a set of Common Service Functions (CSFs) (i.e., service capabilities). An instantiation of a set of one or more particular types of CSFs is referred to as a Common Services Entity (CSE), which can be hosted on different types of network nodes (e.g., infrastructure node, middle node, application-specific node). Further, the enabling reliable and continued distributed M2M/IoT services of the present application may be implemented as part of an M2M network that uses a Service Oriented Architecture (SOA) or a resource-oriented architecture (ROA) to access services such as the enabling reliable and continued distributed M2M/IoT services of the present application.

As discussed herein, the service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications r various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware or software and that provides (service) capabilities or functionalities exposed to various applications or devices (i.e., functional interfaces between such functional entities) in order for them to use such capabilities or functionalities.

Figure 32C:
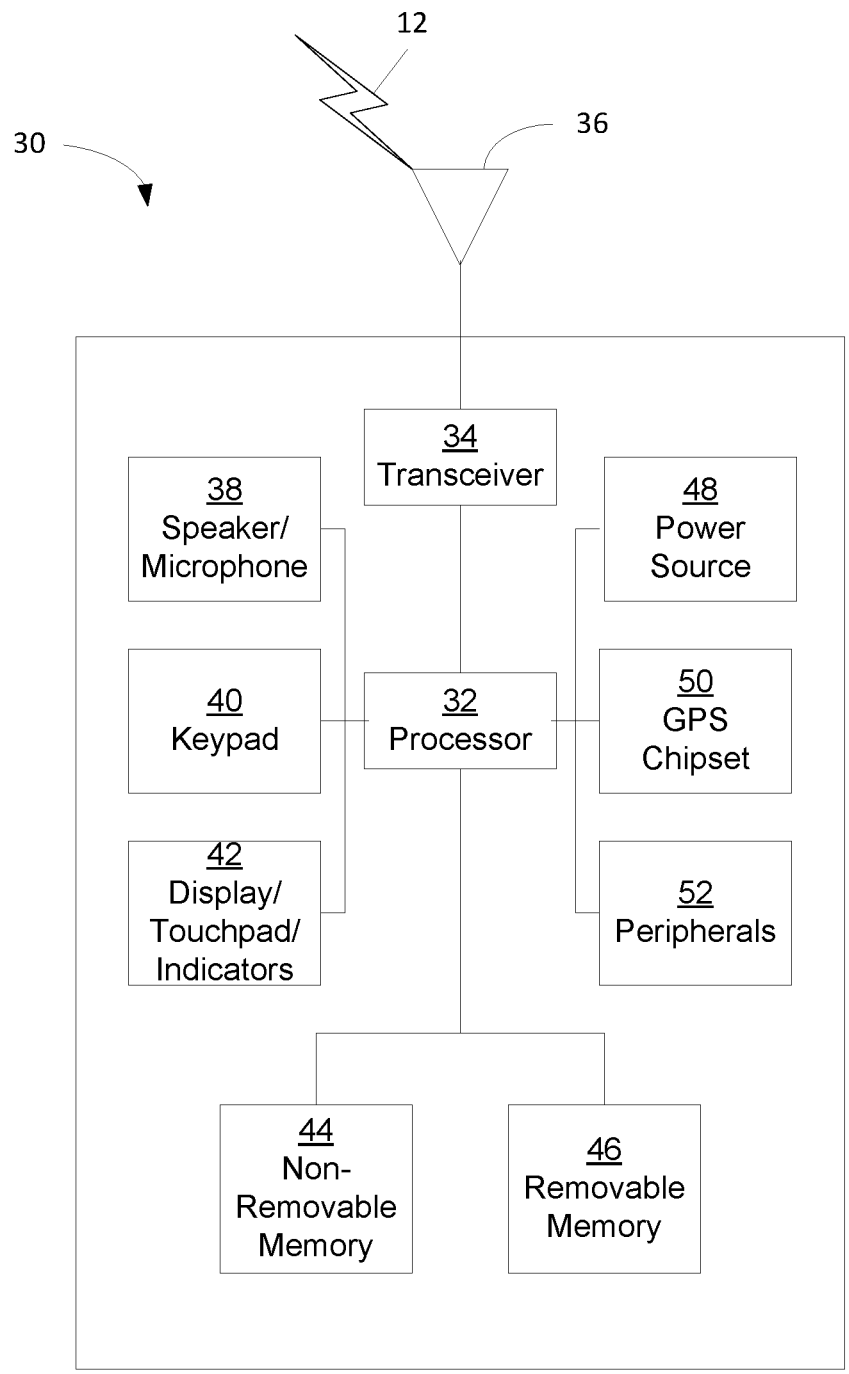
FIG. 32C illustrates an exemplary M2M/IoT terminal or gateway device that may be used within the communications system illustrated in FIG. 32A.

FIG. 32C is a system diagram of an example M2M device 30, such as an M2M terminal device 18 (which may include device 111, device 112, or registree AE 250) or an M2M gateway device 14 (which may include one or more components of FIG. 19, such as gateway 113, gateway 114, registrar CSE 252), for example. As shown in FIG. 32C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 (e.g., gateway 113, gateway 114, gateway 115, registrar device 252, device 111, device 112, or registree AE 250, and others) may be an exemplary implementation that performs the disclosed systems and methods for enabling reliable and continued distributed M2M/IoT services.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, or any other functionality that enables the M2M device 30 to operate in a wireless environment. The processor 32 may be coupled to the transceiver 34, which may be coupled to the transmit/receive element 36. While FIG. 32C depicts the processor 32 and the transceiver 34 as separate components, it will be appreciated that the processor 32 and the transceiver 34 may be integrated together in an electronic package or chip. The processor 32 may perform application-layer programs (e.g., browsers) or radio access-layer (RAN) programs or communications. The processor 32 may perform security operations such as authentication, security key agreement, or cryptographic operations, such as at the access-layer or application layer for example.

The transmit/receive element 36 may be configured to transmit signals to, or receive signals from, an M2M service platform 22. For example, the transmit/receive element 36 may be an antenna configured to transmit or receive RF signals. The transmit/receive element 36 may support various networks and air interfaces, such as WLAN, WPAN, cellular, and the like. In an example, the transmit/receive element 36 may be an emitter/detector configured to transmit or receive IR, UV, or visible light signals, for example. In yet another example, the transmit/receive element 36 may be configured to transmit and receive both RF and light signals. It will be appreciated that the transmit/receive element 36 may be configured to transmit or receive any combination of wireless or wired signals.

In addition, although the transmit/receive element 36 is depicted in FIG. 32C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the registrations or switching of gateways in some of the examples described herein are successful or unsuccessful (e.g., determining non-functional, inactive registrars, etc.), or otherwise indicate a status of enabling reliable and continued distributed M2M/IoT services and associated components. The control lighting patterns, images, or colors on the display or indicators 42 may be reflective of the status of any of the method flows or components in the FIG.'s illustrated or discussed herein (e.g., FIG. 12-FIG. 21, FIG. 28 and FIG. 29, etc). Disclosed herein are messages and procedures of enabling reliable and continued distributed M2M/IoT services. The messages and procedures may be extended to provide interface/API for users to request service layer related information via an input source (e.g., speaker/microphone 38, keypad 40, or display/touchpad 42). In an addition example, there may be a request, configure, or query of information for enabling reliable and continued distributed M2M/IoT services, among other things that may be displayed on display 42.

The processor 32 may receive power from the power source 48, and may be configured to distribute or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with information disclosed herein.

The processor 32 may further be coupled to other peripherals 52, which may include one or more software or hardware modules that provide additional features, functionality or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The transmit/receive elements 36 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The transmit/receive elements 36 may connect to other components, modules, or systems of such apparatuses or devices via one or more interconnect interfaces, such as an interconnect interface that may comprise one of the peripherals 52.

Figure 32D:
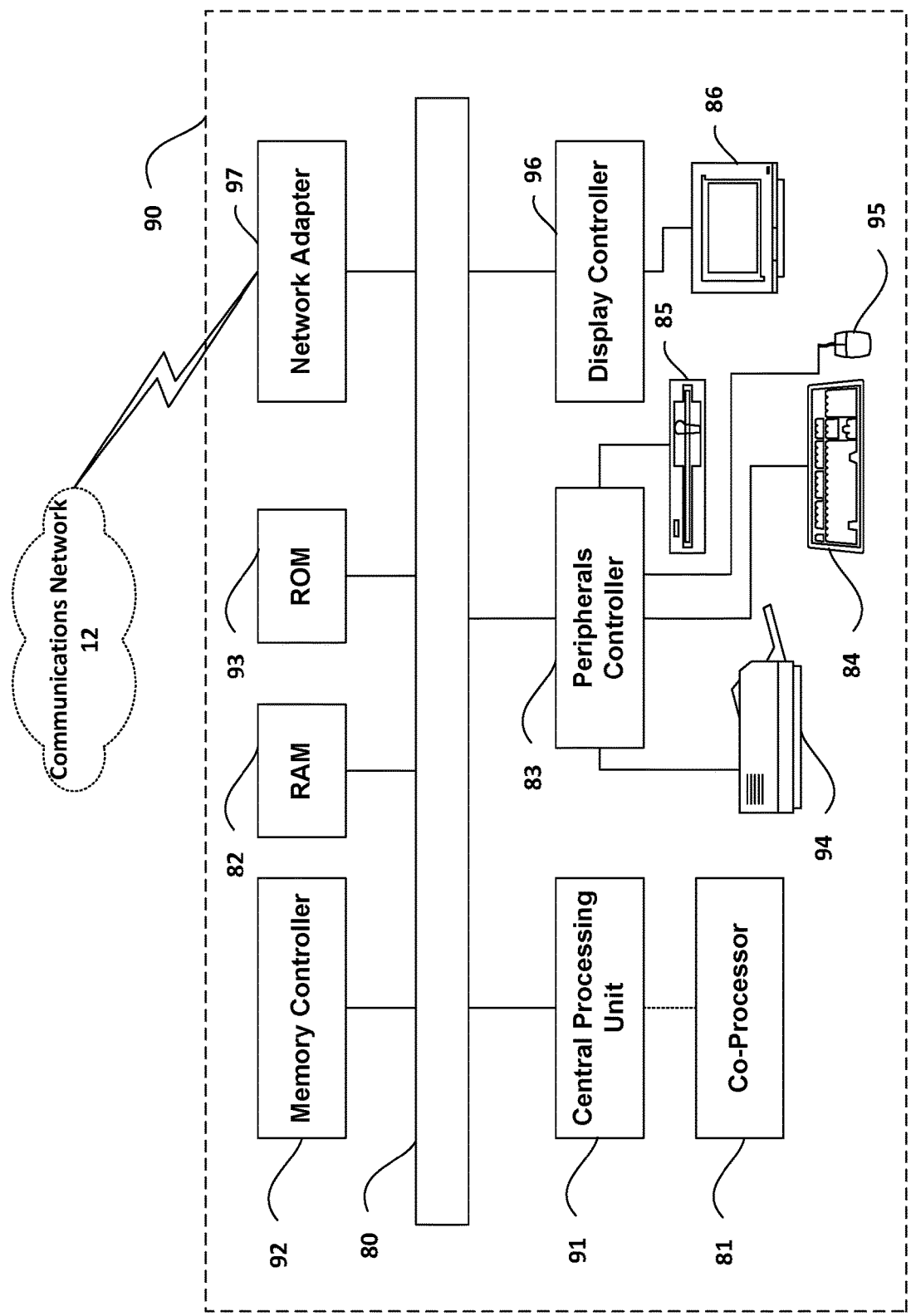
FIG. 32D illustrates an exemplary computing system in which aspects of the communication system of FIG. 32A may be embodied.

FIG. 32D is a block diagram of an exemplary computing system 90 on which, for example, the M2M service platform 22 of FIG. 32A and FIG. 32B may be implemented. Computing system 90 (e.g., M2M terminal device 18 or M2M gateway device 14) may comprise a computer or server and may be controlled primarily by computer readable instructions by whatever means such instructions are stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 or coprocessor 81 may receive, generate, and process data related to the disclosed systems and methods for enabling reliable and continued distributed M2M/IoT services, such as receiving request message that include requirements (e.g., reliability of gateway, owner, etc.).

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 can be read or changed by CPU 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may include peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include network adaptor 97 that may be used to connect computing system 90 to an external communications network, such as network 12 of FIG. 32A and FIG. 32B.

It is understood that any or all of the systems, methods and processes described herein may be embodied in the form of computer executable instructions (e.g., program code) stored on a computer-readable storage medium which instructions, when executed by a machine, such as a computer, server, M2M terminal device, M2M gateway device, or the like, perform or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals per se. As evident from the herein description, storage media should be construed to be statutory subject matter. Computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred methods, systems, or apparatuses of the subject matter of the present disclosure—enabling reliable and continued distributed M2M/IoT services—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means for enabling reliable and continued distributed M2M/IoT services. A method, system, computer readable storage medium, or apparatus has means for obtaining, from an application entity, a request message to register with the apparatus, wherein the apparatus is a service layer registrar entity; based on the request message, reporting the request message to a server; and based on the reported request message, obtaining a list of one or more inactive service layer entities that are used as backup for the application entity, wherein the reported request message comprises a reliability requirement for active service layer entities or inactive service layer entities. The method, system, computer readable storage medium, or apparatus has means for triggering a first inactive service layer entity of the list of one or more inactive service layer entities to become active when the apparatus is non-functional. A determination of non-functional may be based on the apparatus not meeting the reliability requirement. When the apparatus goes from non-functional to functional, the apparatus may be added to the list of inactive service layer entities that are used as backup for the application entity or used for another application entity as primary or backup. The apparatus may be an active service layer registrar entity for the application entity (e.g., end mobile device or sensor). The request message may include a minimum number of inactive service layer entities requested or other information that may be the basis for determining the active or inactive service layer entities. The method, system, computer readable storage medium, or apparatus has means for creating an inactive registration using an identifier. The method, system, computer readable storage medium, or apparatus has means for sending an inactive registration request in order to create an inactive service layer entity for the application entity. The method, system, computer readable storage medium, or apparatus has means for enabling an active service layer (SL) registrar entity to keep service layer context synchronized on an inactive SL registrar entity for the registree entity without adding significant overhead to the registree entity; triggering an inactive SL registrar entity to provide continued service when the active SL registrar entity is non-functional; and enabling a SL entity to provide continued service to other SL entities when it is recovered from a failure. All combinations in this paragraph (including the removal or addition of steps) are contemplated in a manner that is consistent with the other portions of the detailed description.

What is claimed:

1. An apparatus that enables backup service layer entities, the apparatus comprising:
   a processor; and
   a memory coupled with the processor, the memory comprising executable instructions stored thereon that when executed by the processor cause the processor to effectuate operations comprising:
      obtaining, from an application entity, a request message to register with the apparatus, wherein the apparatus is a service layer registrar entity, wherein the request message comprises a minimum number of inactive service layer entities required;
      based on the request message, reporting the request message to a server; and
      based on the reported request message, obtaining a list of one or more inactive service layer entities that are used as backup for the application entity, wherein the reported request message comprises a reliability requirement for active service layer entities or inactive service layer entities.

2. The apparatus of claim 1, the operations further comprising triggering a first inactive service layer entity of the list of one or more inactive service layer entities to become active when the apparatus is non-functional.

3. The apparatus of claim 1, the operations further comprising triggering a first inactive service layer entity of the list of one or more inactive service layer entities to become active when the apparatus is non-functional, wherein a determination of non-functional is based on the apparatus not meeting the reliability requirement.

4. The apparatus of claim 1, wherein the apparatus is an active service layer registrar entity for the application entity, the operations further comprising:
   triggering a first inactive service layer entity of the list of one or more inactive service layer entities to become active when the apparatus is non-functional; and
   when the apparatus is functional, sending a message to add the apparatus to the list of inactive service layer entities that are used as backup for the application entity.

5. The apparatus of claim 1, the operations further comprising creating an inactive registration using an identifier.

6. The apparatus of claim 1, the operations further comprising sending an inactive registration request to create an inactive service layer entity for the application entity.

7. A method comprising:
   obtaining, from an application entity, a request message to register with an apparatus, wherein the apparatus is a service layer registrar entity, wherein the request message comprises a minimum number of inactive service layer entities required;
   based on the request message, reporting, the request message to a server; and
   based on the reported request message, obtaining a list of one or more inactive service layer entities that are used as backup for the application entity, wherein the reported request message comprises a reliability requirement for active service layer entities or inactive service layer entities.

8. The method of claim 7, further comprising triggering a first inactive service layer entity of the list of one or more inactive service layer entities to become active when the apparatus is non-functional.

9. The method of claim 7, further comprising triggering a first inactive service layer entity of the list of one or more inactive service layer entities to become active when the apparatus is non-functional, wherein a determination of non-functional is based on the apparatus not meeting the reliability requirement.

10. The method of claim 7, further comprising creating an inactive registration using an identifier.

11. The method of claim 7, further comprising sending an inactive registration request to create an inactive service layer entity for the application entity.

12. The method of claim 7, wherein the apparatus is an active service layer registrar entity for the application entity, and further comprising:
   triggering a first inactive service layer entity of the list of one or more inactive service layer entities to become active when the apparatus is non-functional; and
   when the apparatus is functional, adding the apparatus to the list of inactive service layer entities that are used as backup for the application entity.

13. A computer-readable storage medium storing computer executable instructions that when executed by a computing device cause said computing device to effectuate operations comprising:
   obtaining, from an application entity, a request message to register with an apparatus, wherein the apparatus is a service layer registrar entity, wherein the request message comprises a minimum number of inactive service layer entities required;
   based on the request message, reporting the request message to a server; and
   based on the reported request message, obtaining a list of one or more inactive service layer entities that are used as backup for the application entity, wherein the reported request message comprises a reliability requirement for active service layer entities or inactive service layer entities.

14. The apparatus of claim 13, the operations further comprising triggering a first inactive service layer entity of the list of one or more inactive service layer entities to become active when the apparatus is non-functional.

15. The apparatus of claim 13, the operations further comprising triggering a first inactive service layer entity of the list of one or more inactive service layer entities to become active when the apparatus is non-functional, wherein a determination of non-functional is based on the apparatus not meeting the reliability requirement.

16. The apparatus of claim 13, wherein the apparatus is an active service layer registrar entity for the application entity, the operations further comprising:
- triggering a first inactive service layer entity of the list of one or more inactive service layer entities to become active when the apparatus is non-functional; and
- when the apparatus is functional, sending a message to add the apparatus to the list of inactive service layer entities that are used as backup for the application entity.

17. The apparatus of claim 13, the operations further comprising sending an inactive registration request to create an inactive service layer entity for the application entity.

\* \* \* \* \*